(12) United States Patent
Sawant et al.

(10) Patent No.: US 11,465,946 B2
(45) Date of Patent: Oct. 11, 2022

(54) CROP NUTRITION AND FORTIFICATION COMPOSITION

(71) Applicants: Arun Vitthal Sawant, Thane (IN); Thankapan Vadakekuttu, Navi Mumbai (IN)

(72) Inventors: Arun Vitthal Sawant, Thane (IN); Thankapan Vadakekuttu, Navi Mumbai (IN)

(*) Notice: Subject to any disclaimer, the term of this patent is extended or adjusted under 35 U.S.C. 154(b) by 68 days.

(21) Appl. No.: 17/054,123

(22) PCT Filed: May 4, 2019

(86) PCT No.: PCT/IB2019/053660
§ 371 (c)(1),
(2) Date: Nov. 9, 2020

(87) PCT Pub. No.: WO2019/215562
PCT Pub. Date: Nov. 14, 2019

(65) Prior Publication Data
US 2021/0114949 A1    Apr. 22, 2021

(30) Foreign Application Priority Data

May 10, 2018 (WO) .................. PCT/IB2018/053251
Sep. 6, 2018 (IN) .............................. 201821033608

(51) Int. Cl.
*C05D 3/00* (2006.01)
*C05F 9/02* (2006.01)
(Continued)

(52) U.S. Cl.
CPC ................ *C05D 3/00* (2013.01); *C05B 17/00* (2013.01); *C05D 9/02* (2013.01); *C05F 9/02* (2013.01); *C05G 5/12* (2020.02); *C05G 5/27* (2020.02)

(58) Field of Classification Search
None
See application file for complete search history.

(56) References Cited

U.S. PATENT DOCUMENTS 6,749,659 B1 * 6/2004 Yu ............................ C05D 9/00
                                                                71/64.11
8,241,387 B2    8/2012 Shah
(Continued)

FOREIGN PATENT DOCUMENTS

GB      2513232 A       10/2014
WO      2008084495 A2   7/2008
(Continued)

OTHER PUBLICATIONS

International Search Report from PCT/IB2019/053660 dated Aug. 21, 2019.
(Continued)

*Primary Examiner* — Wayne A Langel
(74) *Attorney, Agent, or Firm* — Melissa M. Hayworth; E. Joseph Gess

(57) ABSTRACT

The invention relates to a water dispersible granular composition comprising 1% to 70% of one or more of iron salts, complexes, derivatives, mixtures thereof, 1% to 90% of elemental sulphur, and 1-30% of at least one dispersing agent; wherein the granules are in the size range of 0.1-2.5 mm and comprises particles in the size range of 0.1-20 microns. The invention further relates to a liquid suspension composition comprising 1% to 55% of at least one or more of iron salts, complexes, derivatives, mixtures thereof and 1% to 60% elemental sulphur, 0.01-5% of at least one structuring agent and at least one agrochemically acceptable excipient; wherein the composition comprises particles in the size range of 0.1-20 microns. The invention further relates to a process of preparing the composition and to a (Continued)

Figure 1:
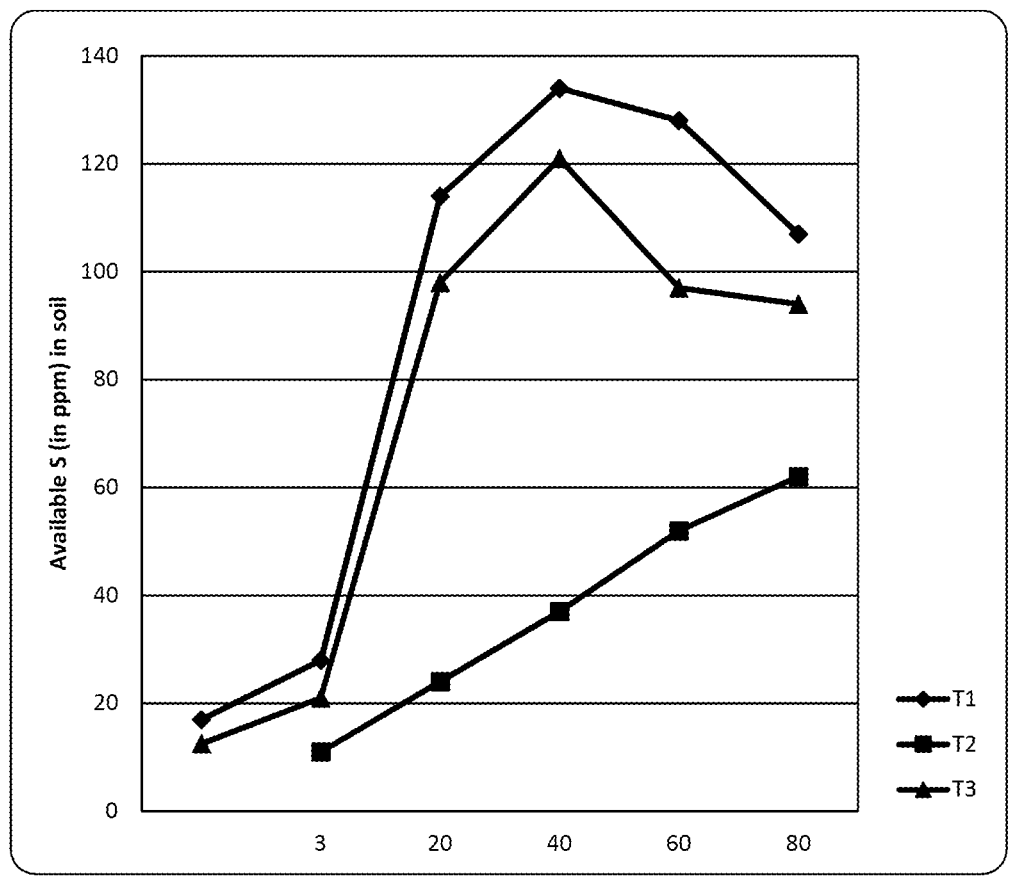

method of treating the plants, seeds, crops, plant propagation material, locus, parts thereof or the soil with the composition.

25 Claims, 2 Drawing Sheets

(51) Int. Cl.
*C05B 17/00* (2006.01)
*C05G 5/27* (2020.01)
*C05G 5/12* (2020.01)
*C05D 9/02* (2006.01)

(56) References Cited

U.S. PATENT DOCUMENTS

| | | | |
|---|---|---|---|
| 8,801,827 B2 | 8/2014 | Taylor et al. | |
| 10,492,489 B2 | 12/2019 | Vadakekuttu et al. | |
| 2016/0229761 A1* | 8/2016 | Cherry | C05G 3/40 |
| 2017/0283334 A1* | 10/2017 | Rohrer | C05D 9/02 |
| 2017/0327430 A1* | 11/2017 | Allais | C05D 9/02 |
| 2017/0356002 A1* | 12/2017 | Thompson | C12Y 302/01 |
| 2018/0029945 A1 | 2/2018 | Miranda Valencia | |
| 2018/0339951 A1* | 11/2018 | McLaughlin | C05D 9/00 |
| 2021/0122681 A1 | 4/2021 | Sawant et al. | |

FOREIGN PATENT DOCUMENTS

| | | |
|---|---|---|
| WO | 2009125435 A2 | 10/2009 |
| WO | 2012131702 A1 | 10/2012 |
| WO | 2016113665 A1 | 7/2016 |
| WO | 2016183685 A1 | 11/2016 |

OTHER PUBLICATIONS

International Search Report from PCT/IB2018/053251 dated Aug. 17, 2018.

* cited by examiner

CROP NUTRITION AND FORTIFICATION COMPOSITION

RELATED APPLICATIONS

The present application is a U.S. National Stage filing under 35 U.S.C. § 371 of International Application No. PCT/IB2019/053660 filed May 4, 2019, which claims priority to Indian Application No. 201821033608 filed 6 Sep. 2018 and to International Application No. PCT/IB2018/053251 filed 10 May 2018, the contents of all of which are incorporated herein by reference in their entireties.

1. FIELD OF THE INVENTION

The invention relates to a crop nutrition and fortification composition comprising an effective amount of elemental sulphur and one or more iron salts, complexes, derivatives or mixtures thereof with at least one agrochemically acceptable excipient; wherein the composition comprises of particles in the size range of 0.1-20 microns. Furthermore, the invention relates to a water dispersible granular composition comprising one or more iron salts, complexes, derivatives or mixtures thereof, elemental sulphur, and at least one dispersing agent; wherein the composition comprises granules in the size range of 0.1-2.5 mm. The invention also relates to crop nutrition and fortification composition in the form of a liquid suspension including one or more iron salts, complexes, derivatives or mixtures thereof; elemental sulphur, at least one structuring agent and at least one agrochemically acceptable excipient. Furthermore, the invention relates to a process of preparing the crop nutrition and fortification composition and to a method of treating plants, seeds, crops, plant propagation material, locus, parts thereof or soil with the crop nutrition and fortification composition.

2. BACKGROUND OF THE INVENTION

In describing the embodiments of the invention, specific terminology is chosen for the sake of clarity. However, it is not intended that the invention be limited to the specific terms so selected and it is to be understood that each specific term includes all technical equivalents that operate in a similar manner to accomplish a similar purpose.

Nutrition is the key element in growth and development of the crops. Poor and inadequate availability of nutrients to the plants results in lack of proper growth and physiological development. As a consequence, the plants become more susceptible to attack by pests. Other problems associated with agriculture are environmental conditions such as drought, biotic and abiotic stress, soil condition which lead to reduction in the yield and quality of produce. Thus, providing adequate nutrition pertaining to the environmental conditions remains a great challenge. Identifying the optimized condition, use of crop nutrients and fertilizers has always been the long felt need of farmers to improve the nutrient use efficiency of fertilizer by crops so as to improve soil and plant health, provide better economic return to farmers and also reduce the burden on the environment.

Iron (Fe) is an essential nutrient element required for plant or crop growth, development and reproduction, however, in relatively small amounts, thus making it a micronutrient. Iron is involved in many important physiological processes in plants such as the manufacturing process of chlorophyll and a range of enzymes and proteins. It also plays a role in respiration, nitrogen fixation, energy transfer and metabolism in crops and plants.

Iron is relatively immobile once incorporated into the tissues in the upper parts of the plants, and as a result, the translocation of iron from one plant part to another is restricted, which leads to iron deficiency. Such deficiency in plants or crops is commonly responsible for chlorosis (yellowing). Moreover, poor iron nutrition also results in poor nodulation of legume crops, leading to reduced size and yield.

It was observed that managing iron nutrition of crops is difficult due to factors such as carbonate levels in the soil, salinity, soil moisture, soil alkalinity, low temperature, and concentration of other nutrient elements (e.g. competitive microelements such as phosphorus, calcium) may also affect the iron availability and at times leads to iron deficiency. Also the ability of plants to respond to iron availability ultimately affects human nutrition, both in terms of crop yield and the iron concentration in the edible plant tissues. Therefore, proper iron nutrition is critical for optimizing the crop nutrition and metabolism, which in turn contribute to the crop yield and quality.

Further, known iron based compositions in the form of pellets; pastilles etc. have a larger size distribution, resulting in their poorer suspensibility, uneven distribution in soil and coverage on the crop. Moreover, these conventional fertilizers are available in forms, which are not completely soluble or do not disperse adequately. This presents a great challenge to the user and the environment. As these compositions are not completely soluble, they leave behind a residue. Such commercially available iron based compositions also tend to either settle or sediment at the bottom of the packaging or the container from which it is to be applied, thereby fail to exhibit desired spreadability, causing problems in application by drip irrigation, and lack uniform distribution of the components to the crops for right uptake.

Moreover, the role of sulphur as an essential and a growing nutrient and fertilizer in agriculture has been long known. The most common approach to provide sulphur nutrition to plants and soil is to use sulphur as elemental sulphur as it is 100% Sulphur. Teachings in the art would motivate a person of skill in the art to prepare a composition with larger particle size as milling of elemental sulphur pose serious risk of explosion or fire hazards and thus incorporating reduced particle size of elemental sulphur in the composition remains a challenge. Conventionally, sulphur based composition known in the art have larger particle size such as bentonite granules or pastilles, sulphur pellets, sulphur granules, molten sulphur etc.

Agricultural compositions which include fertilizer, micronutrients are known in the art and mostly talk about milling or crushing of insoluble micronutrients so as to form fine powder or dust. However, milling of only insoluble micronutrients and mixing other fertilizers, micronutrients and excipients together would lead to non-uniform blend of actives in the formulation which may not be desirable in terms of its application and also poor uptake of the nutrition by the plants.

Known compositions comprising sulphur and iron namely pastilles or pellets have been associated with several drawbacks. Pastilles or pellets of micronutrients such as iron and sulphur include swelling clays which swell on coming in contact with moisture and thereby disintegrate to release the actives. Such pellets or pastilles lead to irregular release of the micronutrients resulting in poorer field efficacy in crops. Again such pastille compositions are only suitable for broadcast applications, owing to their own disadvantages namely; poor dispersion and suspensibility in water because of its larger size resulting in nozzle clogging in spray applications, posing a problem in delivery of nutrients to the plant or the crop. Due to these drawbacks, such prior art pastille compositions containing iron and sulphur have no commercially feasibility or applicability in drip or sprinkler irrigation system which today is an essential mode of irrigation on account of labour shortage and water scarcity.

Furthermore, the other formulations disclosed in the art would direct a person to arrive at viscous liquids which are highly concentrated, resulting in issues in practical application. These highly concentrated formulations are difficult to be diluted in water. Such compositions do not form a stable dispersion and tend to form a hard pack, thus rendering them unsuitable for use. Such viscous, large particle size formulations being unpourable tend to clog the nozzles and pose a problem in delivery of nutrients to the plant or crop.

Thus, no suitable compositions comprising iron in combination with fertilizer such as sulphur is known or available, which can be effectively used as a nutrient to meet the requirement of plants and address the drawbacks discussed above with known compositions.

It was noted by the present inventors that the composition of the present invention is synergistic in nature and when formulated at a specific particle size, made both sulphur and iron readily available for uptake by the plants and increase the overall yield. Further, it was observed that the selection of specific type of iron salts in combination with elemental sulphur prevents leaching of iron and makes it available to the fullest for the uptake by crops. This helps in reducing chlorosis in younger growing leaves, improves chlorophyll content, disease resistance, iron uptake which results in a nutritionally rich crop.

Furthermore, the inventors of the present invention found that the application of iron along with sulphur in the form of the present composition improves the nutrient use efficiency of both sulphur and iron by plant i.e. plant uptakes higher amount of sulphur and iron from lesser quantities of fertilizer applied in soil. Moreover, the inventors of the present application have determined that the crop nutrition or fortification compositions of the present invention including effective amounts of one or more iron salts, complexes, derivatives or mixtures thereof; and elemental sulphur and at least one agrochemically acceptable excipient; with particle size in the range of from 0.1-20 microns demonstrate excellent field efficacy. This novel composition helps to improve plant yield, iron uptake, reduce yellowing of leaves and plant physiological parameters such as increased rooting, improved foliage, disease resistance, increased greenness of the crops providing a nutritionally rich and fortified crop. The composition can be in the form of water dispersible granular composition and liquid suspension composition. The composition of the present invention also exhibits superior physical characteristics such as suspensibility, dispersibility, flowability, wettabilty and improved viscosity resulting in better pourability. The compositions of the present invention also demonstrated superior performance under accelerated storage conditions and also effective usage in drip irrigation. Moreover, the composition exhibits a surprisingly higher field efficacy at reduced dosages of application of the composition.

3. SUMMARY OF THE INVENTION

The inventors have determined that a water dispersible granular crop nutrition and fortification composition comprising effective amounts of one or more iron salts, complexes, derivatives or mixtures thereof, elemental sulphur and at least one dispersing agent, provides a higher yield in various crops and improves plant physiological parameters and also finds a direct use in micro irrigation systems. The water dispersible granules comprise one or more iron salts, complexes, derivatives or mixtures thereof in a concentration range of 1% to 70% by weight of the total composition, elemental sulphur in a concentration range of 1% to 90% by weight of the total composition, and at least one dispersing agent in the range of 1%-30% by weight of the total composition. Further, the water dispersible granular crop nutrition and fortification composition comprises granules in the size range of 0.1-2.5 mm and which disperses into particles in the size range of 0.1 micron to 20 microns. Further, the water dispersible granules have almost no hardness.

Furthermore, the inventors of the application have also found that a crop nutrition and fortification composition in the form of a liquid suspension comprising effective amounts of elemental sulphur, one or more iron salts, complexes, derivatives or mixtures thereof; at least one structuring agent and at least one agrochemically acceptable excipient; with a particle size range of about 0.1-20 microns, demonstrated a high yield in certain crops and also finds a direct use in micro irrigation systems. The liquid suspension comprises iron salts, complexes, derivatives or mixtures thereof in a concentration range of 1% to 55% by weight of the total composition, elemental sulphur in the range of 1% to 60% by weight of the total composition, at least one structuring agent in the range of 0.01% to 5% by weight of total composition and at least one agrochemical active excipient; the composition comprises particles in the size range of 0.1-20 microns.

Furthermore, the invention relates to a process of preparing the crop nutrition and fortification composition comprising effective amounts of one or more iron salts, complexes, derivatives or mixtures thereof with elemental sulphur and at least one agrochemically acceptable excipient; the composition having a particle size in the range of from 0.1-20 microns.

The invention also relates to a method of treating the plants, seeds, crops, plant propagation material, locus, parts thereof or the soil with the crop nutrition and a fortification composition comprising an effective amount of elemental sulphur and one or more iron salts, complexes, derivatives or mixtures thereof; and at least one agrochemically acceptable excipient.

Quite advantageously, the compositions are applied as a foliar spray or to the soil, through broadcasting or bend/side placement, drenching, drilling or through micro irrigation such as drip or trickle irrigation. The latter case of drip or trickle irrigation further optimizes farming practices, which are greatly challenged by an ever-increasing labour and water shortage. Thus, the compositions of the invention are used in all possible ways of application, as per the convenience of the user.

According to an embodiment, the invention further relates to a method of improving the crop health, improving the crop nutrition, fortifying or strengthening the crop, protecting the crop, enhancing the crop yield or conditioning the soil, treating at least one of seeds, seedling, crops, a plant, plant propagation material, locus, parts thereof or to the surrounding soil with a crop nutrition and fortification composition comprising effective amounts of one or more iron salts, complexes, derivatives or mixtures thereof, elemental sulphur and at least one agrochemically acceptable excipient.

It was observed that the composition exhibited good physical and chemical properties. The composition is readily dispersible, non-viscous and readily pourable, does not form a hard cake and is stable even at extended storage and under higher temperatures which in turn results in superior field performance.

4. DESCRIPTION OF THE DRAWINGS

For a more complete understanding of the invention, reference should now be made to the embodiments illustrated in greater detail in the accompanying drawings and described by way of embodiments of the invention.

FIG. 1: Graphical Representation to study the effect of Elemental sulphur and Ferrric oxide in the form of Water dispersible Granules (WDG), Liquid suspension (SC) and pastilles on availability of Sulphur.

Figure 2:
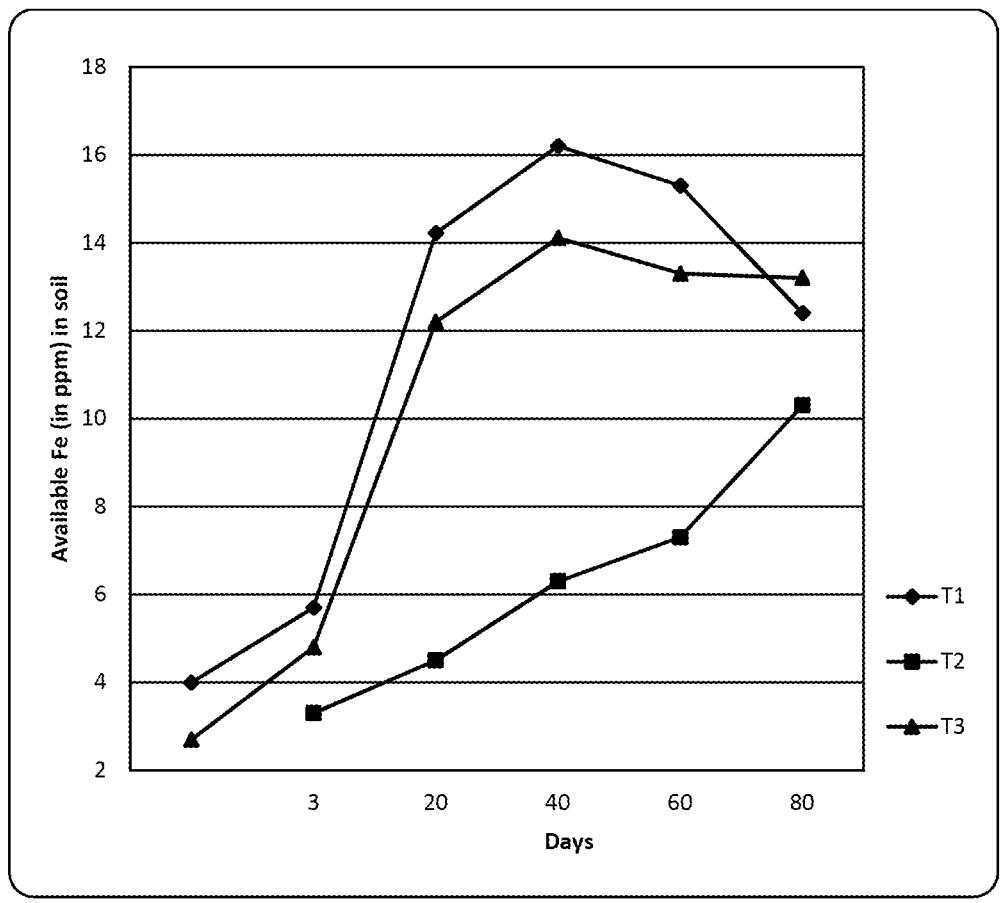

FIG. 2: Graphical Representation to study the effect of Elemental sulphur and Ferrric oxide in the form of Water dispersible Granules (WDG), Liquid suspension (SC) and pastilles on availability of Iron.

5. DESCRIPTION OF THE INVENTION

In describing the embodiment of the invention, specific terminology is chosen for the sake of clarity. However, it is not intended that the invention be limited to the specific terms so selected and it is to be understood that such specific terms include all technical equivalents that operate in a similar manner to accomplish a similar purpose. It is understood that any numerical range recited herein is intended to include all subranges subsumed. Also, unless denoted otherwise percentage of components in a composition are presented as weight percent.

A water dispersible granule is defined as a formulation consisting of granules to be applied after disintegration and dispersion in water. As described herein, "WG" or "WDG" refer to water dispersible granules.

According to the invention, the term liquid suspension encompasses "aqueous suspension" or aqueous dispersion" or "suspension concentrates" or "suspo emulsion" or an SC composition. Liquid suspension can be defined as composition wherein solid particles are dispersed or suspended in a liquid. The liquid as a vehicle can be water and/or a water miscible solvent.

Nutrient use efficiency (NUE) is defined as a measure of how well plants use the available mineral nutrients. Improvement of NUE is an essential pre-requisite for expansion of crop production into marginal lands with low nutrient availability but also a way to reduce use of inorganic fertilizer.

The invention relates to a composition for crop nutrition or fortification which includes 1%-70% by weight of one or more of iron salts, complexes, derivatives or mixtures thereof; 1% to 90% by weight of elemental Sulphur; at least one agrochemically acceptable excipient; the composition having particle size in the range of 0.1 to 20 microns and exhibits improved dispersibility and suspensibility.

According to an embodiment, the crop nutrition and fortification composition is in a solid form or a liquid form. For e.g., the crop nutrition and fortification composition may be in the form of wettable powders, aqueous suspensions, suspo-emulsions, suspension concentrates, aqueous dispersion, water dispersible granules, seed dressings or emulsions for seed treatment, and combinations thereof.

According to an embodiment, the iron salts, complexes, derivatives thereof include water soluble and/or water insoluble iron salts; or complexes or derivatives or mixtures thereof.

According to an embodiment, the iron salts, complexes, derivatives thereof particularly include water insoluble iron salts or complexes or derivatives or mixtures thereof.

According to an embodiment, the water insoluble salts include one or more of iron oxide, iron hydroxide, iron phosphate, iron dichromate, iron fumarate, iron succinate, iron oxalate, iron sucrate, carbonyl iron, their complexes, derivatives and mixtures thereof. The iron oxide include, but is not limited to, Ferrous oxide (FeO), Ferric oxide ($Fe_2O_3$) or red oxide, and Ferroso ferric oxide ($Fe_3O_4$) or black iron oxide. Iron hydroxide includes, but is not limited to, Ferric hydroxide, yellow iron oxide (FeOOH), Iron hydroxide ($Fe(OH)_3$), Iron hydroxide (III), Iron oxyhydroxide and limonite. Iron phosphate includes, but is not limited to, Ferric phosphate, Ferric phosphate dehydrate, Ferric phosphate hydrate, Ferric glycerophosphate, Ferric phosphate, Ferrous pyrophosphate, Ferric pyrophosphate Lithium salt and Lithium ferric phosphate. Iron fumarate includes, but is not limited to Ferrous fumarate and Ferro fumarate. Iron succinate includes but is not limited to Ferrous succinate and Succinic acid Iron (II) salt. However, those skilled in the art will appreciate that it is possible to utilize other water insoluble iron salts without departing from the scope of the invention.

According to an embodiment, the water insoluble iron salts particlualry includes iron oxide. The iron oxide includes, but is not limited to Ferrous oxide (FeO), Ferric oxide ($Fe_2O_3$) or red oxide, and Ferroso ferric oxide ($Fe_3O_4$) or black iron oxide. However, those skilled in the art will appreciate that it is possible to utilize other water insoluble iron salts without departing from the scope of the invention.

According to an embodiment, the iron salts, complexes, derivatives thereof particularly include water soluble iron salts or complexes or derivatives or mixtures thereof. According to an embodiment, the water soluble salts include one or more of iron sulphate, iron citrate, iron ascorbate, iron humate, iron fulvate, iron malate, iron chelate and their complexes, derivatives and mixtures. Iron sulphate includes but is not limited to, ferrous sulfate, Green vitriol, Iron vitriol, Copperas, Melanterite and Szomolnokite. Iron citrate includes but is not limited to, Ferric citrate, Ferric nitrate, Citrate Ferrous Fumarate, Ferric ammonium citrate, Ferric citrate anhydrous, Ferric citrate dehydrate, Ferric citrate hydrate, Ferric citrate iron (+3) salt, Ferric citrate trihydrate, Ferric-citric acid and iron (III) citrate. Iron ascorbate include, but is not limited to, Ferrous ascorbate, (+)-Iron (II) L-ascorbate, and Vitamin C iron (II) salt. However, those skilled in the art will appreciate that it is possible to utilize other water soluble iron salts without departing from the scope of the invention.

According to an embodiment, the iron salts, complexes, derivatives or mixtures thereof are present in the range of 1% to 70% by weight of the total composition. According to an embodiment, the iron salts, complexes, derivatives or mixtures thereof are present in the range of 1% to 40% by weight of the total composition. According to an embodiment, the iron salts, complexes, derivatives or mixtures thereof are present in the range range of 1% to 20% by weight of the total composition. According to an embodiment, the iron salts, complexes, derivatives or mixtures thereof is present in the range of 1% to 10% by weight of the total composition.

According to an embodiment, the elemental sulphur is present in the range of 1% to 90% by weight of the total composition. According to an embodiment, the elemental sulphur is present in the range of 1% to 80% by weight of the total composition. According to an embodiment, the elemental sulphur is present in the range of 1% to 70% by weight of the total composition. According to an embodiment, the elemental sulphur is present in the range of 1% to 50% by weight of the total composition. According to an embodiment, the elemental sulphur is present in the range of 1% to 40% by weight of the total composition.

According to another embodiment, the elemental sulphur is present in the range of 20% to 90% by weight of the total composition. According to another embodiment, the elemental sulphur is present in the range of 40% to 90% by weight of the total composition.

According to an embodiment, the crop nutrition and fortification composition is in the form of water dispersible granules. According to an embodiment, the crop nutrition and fortification composition in the form of water dispersible granules includes one or more of iron salts, complexes, derivatives or mixtures thereof in the range of 1% to 70% by weight of the total composition and elemental sulphur in the range of 1% to 90% by weight of the total composition and one or more dispersing agents in the range of 1% to 30% by weight of the total composition.

According to an embodiment, the crop nutrition and fortification composition in the form of water dispersible granules includes one or more of water soluble iron salts, complexes, derivatives or mixtures thereof in the range of 1% to 70% by weight of the total composition and elemental sulphur in the range of 1% to 90% by weight of the total composition and one or more dispersing agents in the range of 1% to 30% by weight of the total composition.

According to an embodiment, the crop nutrition and fortification composition in the form of water dispersible granules includes iron sulfate in the range of 1% to 70% by weight of the total composition and elemental sulphur in the range of 1% to 90% by weight of the total composition and one or more dispersing agents in the range of 1% to 30% by weight of the total composition.

According to an embodiment, the crop nutrition and fortification composition in the form of water dispersible granules includes one or more of water insoluble iron salts, complexes, derivatives or mixtures thereof in the range of 1% to 70% by weight of the total composition and elemental sulphur in the range of 1% to 90% by weight of the total composition and one or more dispersing agents in the range of 1% to 30% by weight of the total composition.

According to an embodiment, the crop nutrition and fortification composition in the form of water dispersible granules includes one or more of iron oxide or ferrous oxide or ferric oxide or ferroso ferric oxide in the range of 1% to 70% by weight of the total composition and elemental sulphur in the range of 1% to 90% by weight of the total composition and one or more dispersing agents in the range of 1% to 30% by weight of the total composition.

According to an embodiment, the weight ratio of one or more of iron salts, complexes, derivatives or mixtures to elemental sulphur in a water dispersible granular form is 1:90 to 70:1. According to an embodiment, the weight ratio of one or more of iron salts, complexes, derivatives or mixtures to elemental sulphur in a water dispersible granular form is 1:90 to 3.5:1. According to an embodiment, the weight ratio of one or more of iron salts, complexes, derivatives or mixtures to elemental sulphur in a water dispersible granular form is 1:10 to 10:1. According to an embodiment, the weight ratio of one or more of iron salts, complexes, derivatives or mixtures to elemental sulphur in a water dispersible granular form is 1:2.5 to 1.5:1. According to an embodiment, the weight ratio of one or more of iron salts, complexes, derivatives or mixtures to elemental sulphur in a water dispersible granular form is 1:1.

According to an embodiment, the crop nutrition and fortification composition is in the form of a liquid suspension. According to an embodiment, the crop nutrition and fortification composition in the form of liquid suspension includes one or more of iron salts, complexes, derivatives or mixtures thereof in the range of 1% to 55% by weight of the total composition and elemental sulphur in the range of 1% to 60% by weight of the total composition and one or more structuring agents in the range of 0.01% to 5% by weight of the total composition and one or more agrochemically acceptable excipients.

According to an embodiment, the crop nutrition and fortification composition in the form of liquid suspension includes one or more of water soluble iron salts, complexes, derivatives or mixtures thereof in the range of 1% to 55% by weight of the total composition and elemental sulphur in the range of 1% to 60% by weight of the total composition and one or more structuring agents in the range of 0.01% to 5% by weight of the total composition and one or more agrochemically acceptable excipients.

According to an embodiment, the crop nutrition and fortification composition in the form of liquid suspension includes iron sulfate in the range of 1% to 55% by weight of the total composition and elemental sulphur in the range of 1% to 60% by weight of the total composition and one or more structuring agents in the range of 0.01% to 5% by weight of the total composition and one or more agrochemically acceptable excipients.

According to an embodiment, the crop nutrition and fortification composition in the form of liquid suspension includes one or more of water insoluble iron salts, complexes, derivatives or mixtures thereof in the range of 1% to 55% by weight of the total composition and elemental sulphur in the range of 1% to 60% by weight of the total composition and one or more structuring agents in the range of 0.01% to 5% by weight of the total composition and one or more agrochemically acceptable excipients.

According to an embodiment, the crop nutrition and fortification composition in the form of liquid suspension includes one or more of iron oxide or ferrous oxide or ferric oxide or ferroso ferric oxide in the range of 1% to 55% by weight of the total composition and elemental sulphur in the range of 1% to 60% by weight of the total composition and one or more structuring agents in the range of 0.01% to 5% by weight of the total composition and one or more agrochemically acceptable excipients.

According to an embodiment, the weight ratio of one or more of iron salts, in complexes, derivatives or mixtures thereof to elemental sulphur in a liquid suspension is 1:60 to 55:1. According to an embodiment, the weight ratio of one or more of iron salts, complexes, derivatives or mixtures to elemental sulphur in a liquid suspension is 1:10 to 10:1. According to an embodiment, the weight ratio of one or more of iron salts, complexes, derivatives or mixtures to elemental sulphur in a liquid suspension is 1:2.5 to 1.5:1. According to an embodiment, the weight ratio of one or more of iron salts, complexes, derivatives or mixtures to elemental sulphur in a liquid suspension is 1:1.

According to an embodiment, the crop nutrition and fortification composition in the form of liquid suspension and water dispersible granules comprise particles in the size range of 0.1 micron to 20 microns, preferably, particles in the size range of 0.1 micron to 15 microns and most preferably in the range of 0.1 to 10 microns. Better uptake of iron and sulphur is made available to the crops at a particle size range of about 0.1-20 microns. Thus, the particle size range of 0.1-20 microns of the crop nutrition and fortification composition was found to be important not only in terms of ease of application but also in terms of efficacy.

According to an embodiment, the crop nutrition and fortification composition is in the form of water dispersible granules, wherein the granules are in the size range of 0.1 to 2.5 mm. Preferably, according to an embodiment, the crop nutrition and fortification composition is in the form of water dispersible granules, wherein the granules are in the size range of 0.1-2 mm. Preferably, according to an embodiment, the crop nutrition and fortification composition is in the form of water dispersible granules, wherein the granules are in the size range of 0.1-1.5 mm. Preferably, the crop nutrition and fortification composition is in the form of water dispersible granules, wherein the granules are in the size range of 0.1-1 mm. Most preferably, the crop nutrition and fortification composition is in the form of water dispersible granules, wherein the granules are in the size range of 0.1-0.5 mm. According to an embodiment, the water dispersible granular crop nutrition and fortification composition, wherein the composition is in the form of microgranules. The granules comprise particles in the size range of 0.1 to 20 microns.

According to an embodiment, the crop nutrition and fortification composition may optionally comprise at least one fertilizer. Fertilizers are simply crop nutrients applied to agricultural fields to supplement required elements found naturally in the soil. The soil tends to lose its fertilitity due to continuous nutrient uptake by crops, run off losses with water, leaching, volatilization of nutrients and erosion of soil as a result of which the requirement of the crop is not met. Application of fertilizers not only assist in increasing yield and promoting healthy crop but also helps in development of defence against the pest and disease attack. Thus, application of optimum amount and type of fertilizer to the crops is crucial in meeting the nutrient requirement of the crop.

According to another embodiment, the fertilizers include single nutrient fertilizers, multi nutrient fertilizers, binary fertilizers, compound fertilizers, organic fertilizers or mixtures thereof. However, those skilled in the art will appreciate that it is possible to utilize other fertilizers known in the art, without departing from the scope of the invention.

According to yet another embodiment, the fertilizer comprises one or more of water soluble fertilizer or water insoluble fertilizer, or salts or complexes or derivatives, or mixtures thereof.

According to further embodiment, the fertilizers includes nitrogen, phosphate, potash, ammonia, ammonium nitrate, urea, sodium nitrate, potassium chloride, potassium sulfate, potassium carbonate, potassium nitrate, monoammonium phosphate, diammonium phosphate, calcium ammonium nitrate, super phosphates, phosphogypsum, triple super phosphates, NPK fertilizers or salts or complexes or derivatives, or mixtures thereof. However, those skilled in the art will appreciate that it is possible to use other fertilizers without departing from the scope of the present invention. The fertilizers are commercially manufactured and available through various companies.

According to an embodiment, the fertilizer is present in the range of 1% to 90% by weight of the total composition. Preferably, the fertilizer is present in the range of 1% to 40% by weight of the total composition.

According to an embodiment, the crop nutrition and fortification composition further optionally comprise at least one additional active ingredient which can include one or more of micronutrients, macronutrients, microbes, bacteriospores, one or more pesticidal actives, and biostimulants. The microbes, bacteriospores and biostimulants are commercially developed, manufactured and sourced by the inventors through various commercial suppliers from the world.

According to an embodiment, additional active ingredient is present in an amount of 0.1% to 90% by weight of the composition. According to further embodiment, additional active ingredient is present in an amount of 0.1% to 60% by weight of the composition. According to further embodiment, additional active ingredient is present in an amount of 0.1% to 40% by weight of the composition.

According to another embodiment, the micronutrients comprise one or more of zinc, boron, calcium, magnesium, copper, manganese, silicon, cobalt, chlorine, sodium, molybdenum, chromium, vanadium, selenium, nickel, iodine, Chlorine, Fluorine, Phosphorous, Potassium, in their elemental form, or salts, complexes, derivatives or mixtures thereof. The composition may further optionally comprise of other micronutrients namely one or more of vitamins, organic acids or salts, complexes or derivatives or mixtures thereof. However, the above list of micronutrients is exemplary and not meant to limit the scope of the invention. The micronutrients are commercially manufactured and sourced through various companies.

According to an embodiment, the micronutrients are present in the range of from 0.1% to 70% by weight of the total composition. According to an embodiment, the micronutrients are present in the range of from 0.1% to 40% by weight of the total composition.

According to an embodiment, the composition may further optionally include biostimulants selected from one or more of, enzymes, humic acid and fulvic acid. The biostimulants used, are commercially manufactured and sourced from various commercial manufacturers around the world. However, those skilled in the art will appreciate that it is possible to utilize different biostimulants without departing from the scope of the present invention.

According to an embodiment, the pesticidal actives include an antifoulant, an insecticide, a fungicide, a herbicide, a nematicide, a pheromone, a defoliant, an acaricide, a plant growth regulator, an algicide, an antifeedant, an avicide, a bactericide, a bird repellent, a biopesticide, a biocide, a chemosterilant, a safener, an insect attractant, an insect repellent, a insect growth regulator, a mammal repellent, a mating disrupter, a disinfectant, a molluscicide, a antimicrobial, a miticide, an ovicide, a fumigant, a plant activator, a rodenticide, a synergist, a virucide, a microbial pesticide, a plant incorporated protectant, other miscellaneous pesticidal actives, or salts, derivatives and mixtures thereof.

According to an embodiment, pesticide is present in an amount of 0.1% to 80% by weight of the composition. According to further embodiment, pesticide is present in an amount of 0.1% to 60% by weight of the composition. According to further embodiment, pesticide is present in an amount of 0.1% to 40% by weight of the composition.

According to an embodiment, the crop nutrition and fortification composition further comprises at least one agrochemically acceptable excipient. According to further embodiment, the agrochemically acceptable excipient comprises one or more of surfactants, dispersing agents, wetting agents, binders or binding agents, disintegrating agents, fillers or carriers or diluents, emulsifiers, solvents, spreading agents, coating agents buffers or pH adjusters or neutralizing agents, antifoaming agents or defoamers, penetrants, preservatives, ultraviolet absorbents, UV ray scattering agents, stabilizers, pigments, colourants, structuring agents, chelating or complexing or sesquitering agents, suspending agents or suspension aid agents, humectants, sticking agents, antifreezing agent or freeze point depressants, and mixtures thereof. However, those skilled in the art will appreciate that it is possible to utilize additional agrochemically acceptable excipients without departing from the scope of the present invention. The agrochemically acceptable excipients are commercially manufactured and sourced through various companies.

According to an embodiment, the crop nutrition and fortification composition in the form of water dispersible granules further comprises at least one agrochemical excipient. According to further embodiment, the agrochemically acceptable excipients which are used in water dispersible granular formulation include at least one disintegrating agents, wetting agents, binders or fillers or carriers or diluents, buffers or pH adjusters or neutralizing agents, antifoaming agents, drift reducing agents, anticaking agent, spreading agents, penetrating agent, sticking agent. However, those skilled in the art will appreciate that it is possible to utilize additional agrochemically acceptable excipients without departing from the scope of the present invention.

According to an embodiment, the crop nutrition and fortification composition in the form of liquid suspension further comprises at least one agrochemical excipient. According to further embodiment, the agrochemically acceptable excipients which are used in suspension concentrates or liquid suspension or aqueous suspension formulations include at least one surfactant, dispersing agent, wetting agent, humectants, solvents, spreading agent, suspending agents or suspension aid, penetrating agent, sticking agents, drift reducing agents, ultraviolet absorbents, UV ray scattering agents, preservatives, stabilizer, buffers or pH adjusters or neutralizing agents, antifreezing agent or freeze point depressants, antifoaming agents, anticaking agent. However, those skilled in the art will appreciate that it is possible to utilize additional agrochemically acceptable excipients without departing from the scope of the present invention.

According to an embodiment, the agrochemical excipients are present in a concentration range of 1%-98% by weight of the total composition. According to an embodiment, the agrochemical excipients are present in a concentration range of at least 98% by weight of the total composition. According to an embodiment, the agrochemical excipients are present in a concentration range of at least 95% by weight of the total composition. According to an embodiment, the agrochemical excipients are present in a concentration range of at least 90% by weight of the total composition. According to an embodiment, the agrochemical excipients are present in a concentration range of at least 75% by weight of the total composition. According to an embodiment, the agrochemical excipients are present in a concentration range of at least 55% by weight of the total composition. According to an embodiment, the agrochemical excipients are present in a concentration range of at least 35% by weight of the total composition. According to an embodiment, the agrochemical excipients are present in a concentration range of at least 25% by weight of the total composition. According to an embodiment, the agrochemical excipients are present in a concentration range of at least 15% by weight of the total composition. According to an embodiment, the agrochemical excipients are present in a concentration range of at least 5% by weight of the total composition. According to an embodiment, the agrochemical excipients are present in a concentration range of at least 1% by weight of the total composition According to an embodiment, the surfactants which are used in the crop nutrition and fortification composition include one or more of anionic, cationic, non-ionic, amphoteric and polymeric surfactants. According to an embodiment, the surfactants include one or more of emulsifiers, wetting agents and dispersing agents.

The anionic surfactants include one or more of, but not limited to a salt of fatty acid, a benzoate, a polycarboxylate, a salt of alkylsulfuric acid ester, alkyl ether sulfates, an alkyl sulfate, an alkylaryl sulfate, an alkyl diglycol ether sulfate, a salt of alcohol sulfuric acid ester, an alkyl sulfonate, an alkylaryl sulfonate, an aryl sulfonate, a lignin sulfonate, an alkyldiphenyletherdisulfonate, a polystyrene sulfonate, a salt of alkylphosphoric acid ester, an alkylaryl phosphate, a styrylaryl phosphate, sulfonate docusates, a salt of polyoxyethylene alkyl ether sulfuric acid ester, a polyoxyethylenealkylaryl ether sulfate, alkyl sarcosinates, alpha olefin sulfonate sodium salt, alkyl benzene sulfonate or its salts, sodium lauroylsarcosinate, sulfosuccinates, polyacrylates, polyacrylates—free acid and sodium salt, salt of polyoxyethylenealkylaryl ether sulfuric acid ester, a polyoxyethylene alkyl ether phosphate, a salt of polyoxyethylenealkylaryl phosphoric acid ester, sulfosuccinates-mono and other diesters, phosphate esters, alkyl naphthalene sulfonate-isopropyl and butyl derivatives, alkyl ether sulfates—sodium and ammonium salts; alkyl aryl ether phosphates, ethylene oxides and its derivatives, a salt of polyoxyethylene aryl ether phosphoric acid ester, mono-alkyl sulphosuccinates, aromatic hydrocarbon sulphonates, 2-acrylamido-2-methylpropane sulfonic acid, ammonium lauryl sulfate, ammonium perfluorononanoate, Docusate, Disodium cocoamphodiacetate, Magnesium laureth sulfate, Perfluorobutanesulfonic acid, Perfluorononanoic acid, carboxylates, Perfluorooctanesulfonic acid, Perfluorooctanoic acid, Phospholipid, Potassium lauryl sulfate, Soap, Soap substitute, Sodium alkyl sulfate, Sodium dodecyl sulfate, Sodium dodecylbenzenesulfonate, Sodium laurate, Sodium laureth sulfate, Sodium lauroylsarcosinate, Sodium myreth sulfate, Sodium nonanoyloxybenzenesulfonate, Sodium pareth sulfate, alkyl carboxylates, Sodium stearate, alpha olefin sulphonates, naphthalene sulfonate salts, alkyl naphthalene sulfonate fatty acid salts, naphthalene sulfonate condensates—sodium salt, fluoro carboxylate, fatty alcohol sulphates, alkyl naphthalene sulfonate condensates—sodium salt, a naphthalene sulfonic acid condensed with formaldehyde or a salt of alkylnaphthalene sulfonic acid condensed with formaldehyde; or salts, derivatives thereof.

Cationic surfactants include one or more of, but not limited to Dialkyl dimethyl ammonium chlorides, Alkyl methyl ethoxylated ammonium chlorides or salts, Dodecyl-, Coco-, Hexadecyl-, Octadecyl-, Octadecyl/Behenyl-, Behenyl-, Cocoamidopropyl-, Trimethyl Ammonium Chloride; Coco-, Stearyl-, bis(2-hydroxyethyl)Methyl Ammonium Chloride, Benzalkonium Chloride, Alkyl-, Tetradecyl-, Octadecyl-Dimethyl Benzyl Ammonium Chloride, Dioctyl-, Di(Octyl-Decyl)-, Didecyl-, Dihexadecyl-Distearyl-, Di(Hydrogenated Tallow)-Dimethyl Ammonium Chloride, Di(Hydrogenated Tallow) Benzyl-, Trioctyl-, Tri(Octyl-Decyl)-, Tridodecyl-, Trihexadecyl-Methyl Ammonium Chloride, Dodecyl Trimethyl-, Dodecyl Dimethyl Benzyl-, Di-(Octyl-Decyl) Dimethyl, Didecyl Dimethyl-Ammonium Bromide, quaternised amine ethoxylates, Behentrimonium chloride, Benzalkonium chloride, Benzethonium chloride, Benzododecinium bromide, Bronidox, quaternary ammonium salts Carbethopendecinium bromide, Cetalkonium chloride, Cetrimonium bromide, Cetrimonium chloride, Cetylpyridinium chloride, Didecyldimethylammonium chloride, Dimethyldioctadecylammonium bromide, Dimethyldioctadecylammonium chloride, Domiphen bromide, Lauryl methyl gluceth-10 hydroxypropyldimonium chloride, Octenidinedihydrochloride, Olaflur, N-Oleyl-1, 3-propanediamine, Pahutoxin, Stearalkonium chloride, Tetramethylammonium hydroxide, Thonzonium bromide; salts or derivatives therof.

The non-ionic surfactants include one or more of but not limited to polyol esters, polyol fatty acid esters, polyethoxylated esters, polyethoxylated alcohols, ethoxylated and propoxylated fatty alcohols, ethoxylated and propoxylated alcohols, EO/PO copolymers; EO and PO block copolymers, di, tri-block copolymers; block copolymers of polyethylene glycol and polypropylene glycol, poloxamers, polysorbates, alkyl polysaccharides such as alkyl polyglycosides and blends thereof, amine ethoxylates, sorbitan fatty acid ester, glycol and glycerol esters, glucosidyl alkyl ethers, sodium tallowate, polyoxyethylene glycol, sorbitan alkyl esters, sorbitan derivatives, fatty acid esters of sorbitan (Spans) and their ethoxylated derivatives (Tweens), and sucrose esters of fatty acids, Cetostearyl alcohol, Cetyl alcohol, Cocamide DEA, Cocamide MEA, Decyl glucoside, Decylpolyglucose, Glycerol monostearate, Lauryl glucoside, Maltosides, Monolaurin, Narrow-range ethoxylate, Nonidet P-40, Non-oxynol-9, Nonoxynols, Octaethylene glycol monododecyl ether, N-Octyl beta-D-thioglucopyranoside, Octyl glucoside, Oleyl alcohol, PEG-10 sunflower glycerides, Pentaethylene glycol monododecyl ether, Polidocanol, Poloxamer, Poloxamer 407, Polyethoxylated tallow amine, Polyglycerol polyricinoleate, Polysorbate, Polysorbate 20, Polysorbate 80, Sorbitan, Sorbitan monolaurate, Sorbitanmonostearate, Sorbitantristearate, Stearyl alcohol, Surfactin, glyceryl laureate, lauryl glucoside, nonylphenolpolyethoxyethanols, nonyl phenol polyglycol ether, castor oil ethoxylate, polyglycol ethers, polyadducts of ethylene oxide and propylene oxide, block copolymer of polyalkylene glycol ether and hydroxystearic acid, tributylphenoxypolyethoxy ethanol, octylphenoxypolyethoxy ethanol, etho-propoxylated-tristyrlphenols, ethoxylated alcohols, polyoxy ethylene sorbitan, fatty acid polyglyceride, a fatty acid alcohol polyglycol ether, acetylene glycol, acetylene alcohol, an oxyalkylene block polymer, a polyoxyethylene alkyl ether, a polyoxyethylenealkylaryl ether, a polyoxyethylenestyrylaryl ether, a polyoxyethylene glycol alkyl ether, polyethylene glycol, a polyoxyethylene fatty acid ester, a polyoxyethylenesorbitan fatty acid ester, a polyoxyethylene glycerin fatty acid ester, Alcohol ethoxylates—C6 to C16/18 alcohols, linear and branched, Alcohol alkoxylates—various hydrophobes and EO/PO contents and ratios, Fatty acid esters—mono and diesters; lauric, stearic and oleic; Glycerol esters—with and without EO; lauric, stearic, cocoa and tall oil derived, Ethoxylatedglycerine, Sorbitan esters—with and without EO; lauric, stearic and oleic based; mono and trimesters, Castor oil ethoxylates—5 to 200 moles EO; non-hydrogenated and hydrogenated, Block polymers, Amine oxides-ethoxylated and non-ethoxylated; alkyl dimethyl, Fatty amine ethoxylates—coco, tallow, stearyl, oleyl amines, a polyoxyethylene hydrogenated castor oil or a polyoxypropylene fatty acid ester; salts or derivatives thereof.

Amphoteric or Zwitterionic surfactants include one or more of, but not limited to one or more of betaine, coco and lauryl amidopropyl betaines, Coco Alkyl Dimethyl Amine Oxides, alkyl dimethyl betaines; C8 to C18, Alkyl dipropionates-sodium lauriminodipropionate, Cocoamidopropylhydroxysulfobetaine, imidazolines, phospholipids phosphatidylserine, phosphatidylethanolamine, phosphatidylcholine, and sphingomyelins, Lauryl Dimethylamine Oxide, alkyl amphoacetates and proprionates, alkyl Ampho(di)acetates, and diprionates, lecithin and ethanolamine fatty amides; or salts, derivatives thereof.

Surfactants that are commercially available under the trademark but are not limited to one or more of Atlas G5000, TERMUL 5429, TERMUL 2510, ECOTERIC®, EULSOGEN® 118, Genapol®X, Genapol®OX-080, Genapol® C 100, Emulsogen® EL 200, Arlacel P135, Hypermer 8261, Hypermer B239, Hypermer B261, Hypermer B246sf, Solutol HS 15, Promulgen™ D, Soprophor 7961P, Soprophor TSP/461, Soprophor TSP/724, Croduret 40, Etocas 200, Etocas 29, Rokacet R26, Cetomacrogol 1000, CHEMONIC OE-20, Triton N-101, Triton X-100, Tween 20, 40, 60, 65, 80, Span20, 40, 60, 80, 83, 85, 120, Brij®, Atlox 4912, Atlas G5000, TERMUL 3512, TERMUL 3015, TERMUL 5429, TERMUL 2510, ECOTERIC®, ECOTERIC® T85, ECO-TERIC® T20, TERIC 12A4, EULSOGEN® 118, Genapol®X, Genapol®OX-080, Genapol® C 100, Emulsogen® EL 200, Arlacel P135, Hypermer 8261, Hypermer B239, Hypermer B261, Hypermer B246sf, Solutol HS 15, Promulgen™ D, Soprophor 7961P, Soprophor TSP/461, Soprophor TSP/724, Croduret 40, Etocas 200, Etocas 29, Rokacet R26, CHEMONIC OE-20, Triton™ N-101, IGEPAL CA-630 and Isoceteth-20. However, those skilled in the art will appreciate that it is possible to utilize other conventionally known surfactants without departing from the scope of the present invention. The surfactants are commercially manufactured and available through various companies.

According to an embodiment, the surfactant is present in an amount of 0.1% to 60% w/w of the total composition. According to an embodiment, the surfactant is present in an amount of 0.1% to 40% w/w of the total composition. According to an embodiment; the surfactant is present in an amount of 0.1% to 30% w/w of the total composition. According to a further embodiment, the surfactant is present in an amount of 0.1% to 20% w/w of the total composition. According to an embodiment, the surfactant is present in an amount of 0.1% to 10% w/w of the total composition.

According to an embodiment, the dispersing agents which are used in the crop nutrition and fortification composition includes, but not limited to one or more of polyvinyl pyrrolidone, polyvinyl alcohol, lignin sulphonates, phenol naphthalene sulphonates, alkali metal, alkaline earth metal and ammonium salts of lignosulfonic acid, lignin derivatives, dibutylnaphthalene-sulfonic acid, alkylarylsulfonates, alkyl sulfates, alkylsulfonates, fatty alcohol sulfates, fatty acids and sulfated fatty alcohol glycol ethers, polyoxyethylene alkyl ethers, dioctyl sulfosuccinate, lauryl sulfate, polyoxyethylene alkyl ether sulphate, polyoxyethylenestyryl phenyl ether sulfate ester salts and the like, alkali metal salts thereof, ammonium salts or amine salts, polyoxyethylene alkyl phenyl ether, polyoxyethylenestyryl phenyl ether, polyoxyethylene alkyl esters, or polyoxyethylenesorbitan alkyl esters, and the like, mixture of sodium salt of naphthalene sulphonic acid urea formaldehyde condensate and sodium salt of phenol sulphonic formaldehyde condensate ethoxylated alkyl phenols, ethoxylated fatty acids, alkoxylated linear alcohols, polyaromatic sulfonates, sodium alkyl aryl sulfonates, glyceryl esters, ammonium salts of maleic anhydride copolymers, maleic anhydride copolymers, phosphate esters, condensation products of aryl sulphonic acids and formaldehyde, addition products of ethylene oxide and fatty acid esters, salts of addition products of ethylene oxide and fatty acid esters, sodium salt of isodecylsulfosuccinic acid half ester, polycarboxylates, sodium alkyl benzene sulfonates, sodium salts of sulfonated naphthalene, ammonium salts of sulfonated naphthalene, salts of polyacrylic acids, sodium salts of condensed phenolsulfonic acid as well as the napthalene sulfonate-formaldehyde condensates, sodium naphthalene sulfonate formaldehyde condensates, tristyrylphenolethoxylate phosphate esters; aliphatic alcohol ethoxylates; alkyl ethoxylates; EO-PO block copolymers; graft copolymers, ammonium salts of sulfonated naphthalene, salts of polyacrylic acids, salts, derivatives thereof.

Commercially available dispersing agents include "Morwet D425" (sodium naphthalene formaldehyde condensate ex Witco Corporation, USA) "Morwet EFW" Sulfated Alkyl Carboxylate and Alkyl Naphthalene Sulfonate—Sodium Salt "Tamol PP" (sodium salt of a phenolsulphonic acid condensate) "Reax 80N" (sodium lignosulphonate) "Wettol D1" sodium alkylnaphthalene sulphonate (ex BASF). However, those skilled in the art will appreciate that it is possible to utilize other conventionally known dispersants without departing from the scope of the present invention. The dispersing agents are commercially manufactured and available through various companies.

According to an embodiment, the dispersing agent is present in an amount of 0.1-60% w/w of the total composition. According to an embodiment, the dispersing agent is present in an amount of 0.1-30% w/w of the total composition. According to an embodiment, the dispersing agent is present in an amount of 3-20% w/w of the total composition.

According to an embodiment the wetting agents used in the crop nutrition and fortification composition include, but not limited to one or more of phenol naphthalene sulphonates, alkyl naphthalene sulfonate, sodium alkyl naphthalene sulfonate, sodium salt of sulfonated alkylcarboxylate, polyoxyalkylated ethyl phenols, polyoxyethoxylated fatty alcohols, polyoxyethoxylated fatty amines, lignin derivatives, alkane sulfonates, alkylbenzene sulfonates, salts of polycarboxylic acids, salts of esters of sulfosuccinic acid, alkylpolyglycol ether sulfonates, alkyl ether phosphates, alkyl ether sulphates and alkyl sulfosuccinic monoesters, salts, derivatives thereof. However, those skilled in the art will appreciate that it is possible to utilize other conventionally known wetting agents without departing from the scope of the present invention. The wetting agents are commercially manufactured and available through various companies.

According to an embodiment, the wetting agent is present in an amount of 0.1%-60% w/w of the total composition. According to an embodiment, the wetting agent is present in an amount of 0.1%-40% w/w of the total composition. According to an embodiment, the wetting agent is present in an amount of 0.1%-30% w/w of the total composition.

Emulsifiers which are used in the crop nutrition and fortification composition include but are not limited one ore more of to Atlas G5000, TERMUL 5429, TERMUL 2510, ECOTERIC®, EMULSOGEN® 118, Genapol®X, Genapol®OX-080, Genapol® C 100, Emulsogen® EL 200, Arlacel P135, Hypermer 8261, Hypermer B239, Hypermer B261, Hypermer B246sf, Solutol HS 15, Promulgen™ D, Soprophor 7961P, Soprophor TSP/461, Soprophor TSP/724, Croduret 40, Etocas 200, Etocas 29, Rokacet R26, CHEMONIC OE-20, Triton™ N-101, Tween 20, 40, 60, 65, 80, Span20, 40, 60, 80, 83, 85, 120, Brij®, Triton™ Atlox 4912, Atlas G5000, TERMUL 3512, TERMUL 3015, TERMUL 5429, TERMUL 2510, ECOTERIC®, ECOTERIC® T85, ECOTERIC® T20, TERIC 12A4, EULSOGEN® 118, Genapol®X, Genapol®OX-080, Genapol® C 100, Emulsogen® EL 200, Arlacel P135, Hypermer 8261, Hypermer B239, Hypermer B261, Hypermer B246sf, Solutol HS 15, Promulgen™ D, Soprophor 7961P, Soprophor TSP/461, Soprophor TSP/724, Croduret 40, Etocas 200, Etocas 29, Rokacet R26, CHEMONIC OE-20, Triton™ N-101, Tween 20, 40, 60, 65, 80 and Span 20, 40, 60, 80, 83, 85, 120 can also be used. However, those skilled in the art will appreciate that it is possible to utilize other conventionally known emulsifiers without departing from the scope of the present invention. The emulsifiers are commercially manufactured and available through various companies.

According to an embodiment, the emulsifier is present in an amount of 0.1%-60% w/w of the total composition. According to an embodiment, the emulsifier is present in an amount of 0.1%-50% w/w of the total composition. According to an embodiment, the emulsifier is present in an amount of 0.1%-30% w/w of the total composition.

According to an embodiment, the solvents used in the crop nutrition and fortification composition include water miscible solvents. The water miscible solvents include, but are not limited to 1, 4-Dioxane, Ethylene glycol, Glycerol, N-Methyl-2-pyrrolidone, 1,3-Propanediol, 1,5-Pentanediol, Propylene glycol, Triethylene glycol, 1,2-Butanediol, 1,3-Butanediol, 1,4-Butanediol, Dimethylformamide, Dimethoxyethane, Dimethyloctanamide, Dimethyldecanamide. However, those skilled in the art will appreciate that it is possible to utilize other water miscible solvents without departing from the scope of the present invention.

According to an embodiment, the solvent is present in an amount of 0.1-95% w/w of the total composition. According to an embodiment, the solvent is present in an amount of 0.1-60% w/w of the total composition. According to an embodiment, the solvent is present in an amount of 0.1-40% w/w of the total composition. According to an embodiment, the solvent is present in an amount of 0.1-30% w/w of the total composition.

According to an embodiment, the disintegrating agents which are used in the crop nutrition and fortification composition include, but not limited to one or more of inorganic water soluble salts e.g. sodium chloride, nitrate salts; water soluble organic compounds such as agar, hydroxypropyl starch, carboxymethyl starch ether, tragacanth, gelatin, casein, microcrystalline cellulose, cross-linked sodium carboxymethyl cellulose, carboxymethyl cellulose, carboxymethyl cellulose calcium, sodium tripolyphosphate, sodium hexametaphosphate, metal stearates, a cellulose powder, dextrin, methacrylate copolymer, Polyplasdone® XL-10 (crosslinked polyvinylpyrrolidone), poly(vinylpyrrolidone), polyaminocarboxylic acid, sulfonated styrene-isobutylene-maleic anhydride copolymer, salts of polyacrylates of methacrylates, starch-polyacrylonitrile graft copolymer, sodium or potassium bicarbonates/carbonates or their mixtures or salts with acids such as citric and fumaric acid, or salts, derivatives thereof. However, those skilled in the art will appreciate that it is possible to utilize different disintegrating agents without departing from the scope of the present invention. The disintegrating agents are commercially manufactured and available through various companies.

According to an embodiment, the disintegrating agent is present in an amount of 0.1% to 50% w/w of the composition. According to an embodiment, the disintegrating agent is present in an amount of 0.1% to 30% w/w of the composition. According to an embodiment, the disintegrating agent is present in an amount of 0.1% to 20% w/w of the composition. According to an embodiment, the disintegrating agent is present in an amount of 0.1% to 10% w/w of the composition.

According to an embodiment, the binding agents or binders which are used in the crop nutrition and fortification composition, but not limited to one or more of proteins, lipoproteins, lipids, glycolipid, glycoprotein, carbohydrates such as monosaccharides, disaccharides, oligosaccharides and polysaccharides, complex organic substance, synthetic organic polymers or derivatives and combinations thereof. However, those skilled in the art will appreciate that it is possible to utilize different binding agents without departing from the scope of the present invention. The binding agents are commercially manufactured and available through various companies.

According to an embodiment, the binding agent is present in an amount of 0.1% to 50% w/w of the composition. According to further embodiment, the binding agent is present in an amount of 0.1% to 30% w/w of the composition. According to further embodiment, the binding agent is present in an amount of 0.1% to 20% w/w of the composition. According to further embodiment, the binding agent is present in an amount of 0.1% to 10% w/w of the composition.

According to an embodiment, the carriers which are used in the crop nutrition and fortification composition include, but are not limited to one or more of solid carriers or fillers or diluents. According to another embodiment, the carriers include mineral carriers, plant carriers, synthetic carriers, water-soluble carriers. However, those skilled in the art will appreciate that it is possible to utilize different carriers without departing from the scope of the present invention. The carriers are commercially manufactured and available through various companies.

The solid carriers include natural minerals like clay such as china clay, acid clay, kaolin such as kaolinite, dickite, nacrite, and halloysite, serpentines such as chrysotile, lizardite, antigorite, and amesite, synthetic and diatomaceous silicas, montmorillonite minerals such as sodium montmorillonite, smectites, such as saponite, hectorite, sauconite, and hyderite, micas, such as pyrophyllite, talc, agalmatolite, muscovite, phengite, sericite, and illite, silicas such as cristobalite and quartz, such as attapulgite and sepiolite; vermiculite, laponite, pumice, bauxite, hydrated aluminas, perlite, sodium bicarbonate, volclay, vermiculites, limestone, natural and synthetic silicates, charcoal, silicas, wet process silicas, dry process silicas, calcined products of wet process silicas, surface-modified silicas, mica, zeolite, diatomaceous earth, derivatives thereof; chalks (Omya®), fuller's earth, loess, mirabilite, white carbon, slaked lime, synthetic silicic acid, starch, modified starch (Pineflow, available from Matsutani Chemical industry Co., Ltd.), cellulose, plant carriers such as cellulose, chaff, wheat flour, wood flour, starch, rice bran, wheat bran, and soyabean flour, tobacco powder, a vegetable powder polyethylene, polypropylene, poly(vinylidene chloride), methyl cellulose, hydroxypropyl cellulose, hydroxypropyl methylcellulose, sodium carboxymethyl cellulose, propylene glycol alginate, polyvinylpyrrolidone, carboxyvinyl polymer, casein sodium, sucrose, salt cake, potassium pyrophosphate, sodium tripolyphosphate, maleic acid, fumaric acid, and malic acid or derivatives or mixtures thereof. Commercially available Silicates are Aerosil brands, Sipemat brands as Sipernat® 50S and CALFLO E, and kaolin 1777. However, those skilled in the art will appreciate that it is possible to utilize different solid carriers without departing from the scope of the present invention. The solid carriers are commercially manufactured and available through various companies.

According to an embodiment, the carrier is present in an amount of 0.1% to 98% w/w of the composition. According to further embodiment, the carrier is present in an amount of 0.1% to 80% w/w of the composition. According to further embodiment, the carrier is present in an amount of 0.1% to 60% w/w of the composition. According to further embodiment, the carrier is present in an amount of 0.1% to 40% w/w of the composition. According to further embodiment, the carrier is present in an amount of 0.1% to 20% w/w of the composition.

According to an embodiment, the anticaking agents which are used in the crop nutrition and fortification composition include, but are not limited to one or more of polysaccharides such as starch, alginic acid, mannose, galactose; poly (vinylpyrrolidone), fumed silica (white carbon), ester gum, a petroleum resin, Foammaster® Soap L sodium stearate, Brij® 700 polyoxyethylene (100) stearylether, Aerosol® OT-B sodium dioctyl sulfosuccinate, Silwet® L-77 silicone-polyether copolymer, sodium acetate, sodium metasilicate, sodium alkylsulfosuccinates, sodium carbonate or bicarbonate, salts or derivatives thereof. However, those skilled in the art will appreciate that it is possible to utilize different anti caking agents without departing from the scope of the present invention. The anti caking agents are commercially manufactured and available through various companies.

According to an embodiment, the antifoaming agents or defoamers which are used in the crop nutrition and fortification composition include, but not limited to one or more of silica, siloxane, silicone dioxide, polydimethyl siloxane, alkyl polyacrylates, ethylene oxide/propylene oxide copolymers, polyethylene glycol, Silicone oils and magnesium stearate or derivatives thereof. Preferred antifoaming agents include silicone emulsions (such as, e.g., Silikon® SRE, Wacker or Rhodorsil® from Rhodia), long-chain alcohols, fatty acids, fluoroorganic compounds. However, those skilled in the art will appreciate that it is possible to utilize other conventionally known antifoaming agents without departing from the scope of the present invention. The antifoaming agents are commercially manufactured and available through various companies.

According to an embodiment, the anti-foaming agent is present in an amount of 0.01% to 20% w/w of the total composition. According to an embodiment, the anti-foaming agent is present in an amount of 0.01% to 10% w/w of the total composition. According to an embodiment, the anti-foaming agent is present in an amount of 0.01% to 5% w/w of the total composition. According to an embodiment, the anti-foaming agent is present in an amount of 0.01% to 1% w/w of the total composition.

According to an embodiment, the pH-adjusters or buffers or neutralizing agents which are used in the crop nutrition and fortification composition include both acids and bases of the organic or inorganic type and mixtures thereof. According to further embodiment, pH-adjusters or buffers or neutralizing agents include, but not limited to one or more of organic acids, inorganic acids and alkali metal compounds or salts, derivatives thereof. According to an embodiment, the organic acids include, but not limited to one or more of citric, malic, adipic, fumaric, maleic, succinic, and tartaric acid, or salts, derivatives thereof; and the mono-, di-, or tribasic salts of these acids or derivatives thereof. Alkali metal compounds include, but not limited to one or more of hydroxides of alkali metals such as sodium hydroxide and potassium hydroxide, carbonates of alkali metals such as sodium carbonate, hydrogencarbonates of alkali metals such as sodium hydrogencarbonate and alkali metal phosphates such as sodium phosphate and mixtures thereof. According to an embodiment, the salts of inorganic acids include, but not limited to one or more of alkali metal salts such as lithium chloride, sodium chloride, potassium chloride, lithium nitrate, sodium nitrate, potassium nitrate, lithium sulfate, sodium sulfate, potassium sulfate, sodium monohydrogen phosphate, potassium monohydrogen phosphate, sodium dihydrogen phosphate, potassium dihydrogen phosphate and the like. Mixtures can also be used to create a pH-adjusters or buffers or neutralizing agents. However, those skilled in the art will appreciate that it is possible to utilize other conventionally known pH-adjusters or buffers or neutralizing agents without departing from the scope of the present invention. The pH-adjusters or buffers or neutralizing agents are commercially manufactured and available through various companies.

According to an embodiment, the pH-adjusters or buffers are present in an amount of 0.01% to 20% w/w of the total composition. According to an embodiment, the pH-adjusters or buffers are present in an amount of 0.01% to 10% w/w of the total composition. According to an embodiment, the pH-adjusters or buffers are present in an amount of 0.01% to 5% w/w of the total composition. According to an embodiment, the pH-adjusters or buffers are present in an amount of 0.01% to 1% w/w of the total composition.

According to an embodiment, the spreading agents which are used in the crop nutrition and fortification composition include, but not limited to one or more of cellulose powder, dextrin, modified starch, crosslinked poly(vinylpyrrolidone), a copolymer of maleic acid with a styrene compound, a (meth)acrylic acid copolymer, a half ester of a polymer consisting of polyhydric alcohol with dicarboxylic anhydride, a water-soluble salt of polystyrenesulfonic acid, fatty acids, latex, aliphatic alcohols, vegetable oils such as cottonseed, or inorganic oils, petroleum distillates, modified trisiloxanes, polyglycol, polyethers, clatharatesor salts or derivatives therof. However, those skilled in the art will appreciate that it is possible to utilize other conventionally known spreading agents without departing from the scope of the present invention. The spreading agents are commercially manufactured and available through various companies.

According to an embodiment, the spreading agent is present in an amount of 0.1% to 20% w/w of the total composition. According to an embodiment, the spreading agent is present in an amount of 0.1% to 10% w/w of the total composition. According to an embodiment, the spreading agent is present in an amount of 0.1% to 5% w/w of the total composition. According to an embodiment, the spreading agent is present in an amount of 0.1% to 1% w/w of the total composition.

According to an embodiment, the sticking agents which are used in the crop nutrition and fortification composition include, but not limited to one or more of paraffin, a polyamide resin, polyacrylate, polyoxyethylene, wax, polyvinyl alkyl ether, an alkylphenol-formalin condensate, fatty acids, latex, aliphatic alcohols, vegetable oils such as cottonseed, or inorganic oils, petroleum distillates, modified trisiloxanes, polyglycol, polyethers, clatharates, a synthetic resin emulsion or salts or derivatives therof. However, those skilled in the art will appreciate that it is possible to utilize other conventionally knownsticking agents without departing from the scope of the present invention. The sticking agents are commercially manufactured and available through various companies. According to an embodiment, the sticking agent can be present in an amount of 0.1% to 30% w/w of the total composition.

According to an embodiment, the sticking agent is present in an amount of 0.1% to 20% w/w of the total composition. According to an embodiment, the sticking agent is present in an amount of 0.1% to 10% w/w of the total composition.

According to an embodiment, the stabilizers which are used in the crop nutrition and fortification composition include, but not limited to one or more of peroxide compounds such as hydrogen peroxide and organic peroxides, alkyl nitrites such as ethyl nitrite and alkyl glyoxylates such as ethyl glyoxylate, zeolite, antioxidants such as phenol compounds, phosphoric acid compounds and the like; ultraviolet absorbers such as benzophenone compounds or derivatives thereof. However, those skilled in the art will appreciate that it is possible to utilize other conventionally known stabilizers without departing from the scope of the present invention. The stabilizers are commercially manufactured and available through various companies.

According to an embodiment, the stabilizer is present in an amount of 0.1% to 30% w/w of the total composition. According to an embodiment, the stabilizer is present in an amount of 0.1% to 20% w/w of the total composition. According to an embodiment, the stabilizer is present in an amount of 0.1% to 10% w/w of the total composition.

According to an embodiment, the preservatives which are used in the crop nutrition and fortification composition include but not limited to, one or more of bactericides, anti-fungal agents, biocides, anti-microbial agents, and antioxidant. Non limiting examples of preservatives include one or more of paraben, its esters and salts, propionic acid and its salts, 2,4-hexadienoic acid (sorbic acid) and its salt, formaldehyde and paraformaldehyde, 2-hydroxybiphenyl ether and its salts, inorganic sulfites and bisulfites, sodium iodate, chlorobutanol, dehydraacetic acid, formic acid, 1,6-bis(4-amidino-2-bromophenoxy)-n-hexane and its salts, 5-amino-1,3-bis(2-ethylhexyl)-5-methylhexahydropyrimidine, 5-bromo-5-nitro-1,3-dioxane, 2-bromo-2-nitropropane-1,3-diol, 2,4-dichlorobenzyl alcohol, N-(4-chlorophenyl)-N'-(3,4-dichlorophenyl) urea, 4-chloro-m-cresol, 2,4,4'-trichloro-2'-hydroxy diphenyl ether, 4-chloro-3,5-dimethyl phenol, 1,1'-methylene-bis(3-(1-hydroxy methyl-2,4-dioximidazolidin-5-yl)urea), poly (hexamethylenediguanide) hydrochloride, 2-phenoxyethanol, hexamethylenetetramine, 1-(3-chloroallyl)-3,5,7-triaza-1-azonia-adamantane chloride, 1(4-chlorophenoxy)-1-(1H-imidazol-1-yl)-3,3-dimethyl-2-butanone, 1,3-bis(hydroxymethyl)-5,5-dimethyl-2,4-imidazolidin-edione, benzyl alcohol, octopirox, 1,2-dibromo-2,4-dicyanobutane, 2,2'-methylenebis(6-bromo-4-chlorophenol), bromochlorophene, dichlorophene, 2-benzyl-4-chlorophenol, 2-chloroacetamide, chlorhexidine, chlorhexidine acetate, chlorhexidine gluconate, chlorhexidine hydrochloride, 1-phenoxypropan-2-ol, N-alkyl(C12-C22)trimethylammonium bromide and chloride, 4,4-dimethyl-1,3-oxazolidine, N-hydroxymethyl-N-(1,3-di(hydroxymethyl)-2,5-dioxoimidazolidin-4-yl)-N'-hydroxymethylurea, 1,6-bis(4-amidinophenoxy)-n-hexane and its salts, glutaraldehyde, 5-ethyl-1-aza-3,7-dioxabicyclo(3.3.0)octane, 3-(4-chlorophenoxy)propane-1,2-diol, Hyamine, alkyl(C8-C18)dimethylbenzyl ammonium chloride, alkyl(C8-C18)dimethylbenzylammonium bromide, alkyl(C8-C18)dimethylbenzylammonium saccharinate, benzyl hemiformal, 3-iodo-2-propynyl butylcarbamate, sodium hydroxymethylaminoacetate, cetyltrimethylammonium bromide, cetylpyridinium chloride, and derivatives of 2H isothiazol-3-one (so-called isothiazolone derivatives) such as alkylisothiazolones (for example 2-methyl-2H-isothiazol-3-one, MIT; chloro-2-methyl-2H-isothiazol-3-one, CIT), benzoisothiazolones (for example 1,2-benzoisothiazol-3(2H)-one, BIT, commercially available as Proxel® types from ICI) or 2-methyl-4,5-trimethylene-2H-isothiazol-3-one (MTIT), C1-C4-alkyl para-hydroxybenzoate, Proxel® from ICI or Acticide® RS from Thor Chemie and Kathon® MK from Rohm & Haas, Bacto-100, thimerosal, Sodium Propinoate, Sodium Benzoate, Propyl Paraben, Propyl Paraben Sodum, Potassium Sorbate, Potassium Benzoate, Phenyl Mercuric Nitrate, Phenyl Etehyl Alcohol, Sodium, Ethylparaben, Methylparaben, Butylparaben, Bezyla Alcohol, Benzothonium Chloride, Cetylpyridinium Chloride, Benzalkonium Chloride, 1,2-benzothiazol-3-one, Preventol® (Lanxess®), Butylhydroxytoluene, potassium sorbate, iodine-containing organic compounds such as 3-bromo-2,3-diiodo-2-propenyl ethyl carbonate, 3-iodo-2-propynyl butyl carbamate, 2,3,3-triiodo allyl alcohol, and parachlorophenyl-3-iodopropargylformal; benzimidazole compounds and benzthiazole compounds such as 2-(4-thiazolyl)benzimidazole and 2-thiocyanomethylthiobenzo-thiazole; triazole compounds such as 1-(2-(2',4'-dichlorophenyl)-1,3-dioxolane-2-ylmethyl)-1H-1,2,4-triazole, 1-(2-(2',4'-dichloro phenyl)-4-propyl-1,3-dioxolane-2-ylmethyl)-1H-1,2,4-triazole, and α-(2-(4-chlorophenyl) ethyl)-α-(1,1-dimethyl ethyl)-1H-1,2,4-triazole-1-ethanol; and naturally occurring compounds such as 4-isopropyl tropolone (hinokitiol) and boraxor salts or derivatives thereof. Antioxidants includes but not limited to one or more of imidazole and imidazole derivatives (e.g. urocanic acid), 4,4'-thiobis-6-t-butyl-3-methylphenol, 2,6-di-t-butyl-p-cresol (BHT), and pentaerythrityltetrakis[3-(3,5,-di-t-butyl-4-hydroxyphenyl)]propionate; amine antioxidants such as N,N'-di-2-naphthyl-p-phenylenediamine; hydroquinoline antioxidants such as 2,5-di(t-amyl)hydroquinoline; phosphorus-containing antioxidants such as triphenyl phosphate, caro-tenoids, carotenes (e.g. α-carotene, β-carotene, lycopene) and derivatives thereof, lipoic acid and derivatives thereof (e.g. dihydrolipoic acid), aurothioglucose, propylthiouracil and further thio compounds (e.g. thioglycerol, thiosorbitol, thioglycolic acid, thioredoxin, N-acetyl, methyl, ethyl, propyl, amyl, butyl, lauryl, palmitoyl, oleyl, γ-linoleyl, cholesteryl and glyceryl esters thereof), and salts thereof, dilaurylthiodipropionate, distearylthiodipropion-ate, thiodipropionic acid and derivatives thereof (esters, ethers, lipids, nucleotides, nucleosides and salts), and sulfoximine compounds (e.g. buthionine-sulfoximi-nes, homocysteine sulfoximine, buthionine sulfones, penta-, hexa-, heptathioninesul-foximine) in very low tolerated doses (e.g. pmol/kg to pmol/kg), α-hydroxy acids (e.g. citric acid, lactic acid, malic acid), humic acids, gallic esters (e.g. propyl, octyl and dodecyl gallate), unsaturated fatty acids and derivatives, hydroquinone and derivatives thereof (e.g. arbutin), ubiquinone and ubiquinol, and derivatives thereof, ascorbyl palmitate, stearate, di-palmitate, acetate, Mg ascorbyl phosphates, diso-diumascorbyl phosphate and sulfate, potassium ascorbyltocopheryl phosphate, isoascorbic acid and derivatives thereof, the coniferyl benzoate of benzoin resin, rutin, rutinic acid and derivatives thereof, disodium rutinyldisulfate, dibutylhydroxytoluene, 4,4-thiobis-6-tert-butyl-3-methylphenol, butylhydroxy anisole, p-octylphenol, mono-(di- or tri-) methyl benzylphenol, 2,6-tert-butyl-4-methylphenol, pentaerythritol-tetrakis 3-(3,5-di-tert-butyl-4-hydroxyphenyl)propionate, butylhydroxyanisol, nordihydroguaiacic acid, nordihydroguaiaretic acid, trihydroxybutyrophenone, uric acid and derivatives thereof, mannose and derivatives thereof, selenium and selenium derivatives (e.g. selenomethionine), stilbenes and stilbene derivatives (e.g. stilbene oxide, trans-stilbene oxide). However, those skilled in the art will appreciate that it is possible to utilize other conventionally known preservatives without departing from the scope of the present invention. The preservatives are commercially manufactured and available through various companies.

According to an embodiment, the preservative or bactericides or anti-fungal agents or biocides or anti-microbial agents or antioxidant is present in an amount of 0.1% to 20% w/w of the total compsoition. According to further embodiment, the preservative or bactericides or anti-fungal agents or biocides or anti-microbial agents or antioxidant is present in an amount of 0.1% to 10% w/w of the total composition. According to further embodiment, the preservative or bactericides or anti-fungal agents or biocides or anti-microbial agents or antioxidant is present in an amount of 0.1% to 5% w/w of the total composition. According to further embodiment, the preservative or bactericides or anti-fungal agents or biocides or anti-microbial agents or antioxidant is present in an amount of 0.1% to 1% w/w of the total composition.

According to an embodiment, the structuring agents which are used in the crop nutrition and fortification composition include, but not limited to one or more of thickeners, viscosity modifiers, tackifiers, suspension aids, rheological modifiers or anti-settling agents. A structuring agent prevents sedimentation of the active ingredient particles after prolonged storage.

According to an embodiment, the structuring agents which are used in the aqeuous suspension composition include, but not limited to one or more polymers such as polyacrylics, polyacrylamides, polysaccharides, hydrophobically modified cellulose derivatives, co-polymers of cellulose derivatives, carboxyvinyl or polyvinyl pyrrolidones, polyethylenes, polyethylene oxide, polyvinyl alcohol and derivatives; clays such as bentonite clays, kaolin, smectite, attapulgites, attaclays with high surface area silica and natural gums such as guar gum, xanthan gum, gum Arabic, gum tragacanth, rhamsan gum, locust bean gum, carageenan, welan gum, veegum, gelatin, dextrin, collagen;

polyacrylic acids and their sodium salts; the polyglycol ethers of fatty alcohols and polyethylene oxide or polypropylene oxide condensation products and mixtures thereof and include ethoxylated alkyl phenols (also designated in the art as alkylaryl polyether alcohols); ethoxylated aliphatic alcohols (or alkyl polyether alcohols); ethoxylated fatty acids (or polyoxyethylene fatty acid esters); ethoxylatedanhydrosorbitol esters (or polyethylene sorbitan fatty acid esters), long chain amine and cyclic amine oxides which are nonionic in basic solutions; long chain tertiary phosphine oxides; and long chain dialkyl sulfoxides, fumed silica, mixture of fumed silica and fumed aluminium oxide, swellable polymers, polyamides or its derivatives; polyols such as glycerine, poly(vinyl acetate), sodium polyacrylate, poly(ethylene glycol), phospholipid (for example, cephalin, and the like); stachyose, fructo-oligosaccharides, amylose, pectins, alginates, hydrocolloids and mixtures thereof. Also, celluloses such as hemicellulose, carboxymethylcellulose, ethylcellulose, hydroxyethylcellulose, hydroxy-methyl ethyl cellulose, hydroxyl ethyl propyl cellulose, methylhydroxyethylcellulose, methylcellulose; starches such, starch acetates, starch hydroxyethyl ethers, ionic starches, long-chain alkyl starches, dextrins, maltodextrin, corn starch, amine starches, phosphates starches, and dialdehyde starches; plant starches such as corn starch and potato starch; other carbohydrates such as pectin, dextrin, amylopectin, xylan, glycogen, agar, gluten, alginic acid, phycocolloids, chitin, or derivatives thereof. However, those skilled in the art will appreciate that it is possible to utilize other conventionally known structuring agents without departing from the scope of the present invention.

Preferred structuring agents include one or more of xanthan gum, aluminum silicate, methylcellulose, polysaccharide, alkaline earth metal silicate, gelatin, and polyvinyl alcohol. The structuring agents are commercially manufactured and available through various companies.

According to an embodiment, the structuring agent is present in an amount of 0.01% to 5% w/w of the composition. According to an embodiment, the structuring agent is present in an amount of 0.01% to 4% w/w of the composition. According to an embodiment, the structuring agent is present in an amount of 0.01% to 3% w/w of the composition. According to an embodiment, the structuring agent is present in an amount of 0.01% to 2% w/w of the composition. According to an embodiment, the structuring agent is present in an amount of 0.01% to 1% w/w of the composition. According to an embodiment, the structuring agent is present in an amount of 0.01% to 0.1% w/w of the composition.

According to an embodiment, the antifreezing agents or freezing point depressants used in the aqeuous suspension composition include, but are not limited to one or more of polyhydric alcohols such as ethylene glycol, diethylene glycol, dipropylene glycol, propylene glycol, butyrolactone, N,N-dimethyl-formamide, glycerol, monohydric or polyhydric alcohols, glycol ethers, glycol ethers, glycol monoethers such as the methyl, ethyl, propyl and butyl ether of ethylene glycol, diethylene glycol, propylene glycol and dipropylene glycol, glycol diethers such as methyl and ethyl diethers of ethylene glycol, diethylene glycol and dipropyleneglycol.or urea, glycerol, isopropanol, propylene glycol monomethyl ether, di- or tripropylene glycol monomethyl ether or cyclohexanol, carbohydrates such as glucose, mannose, fructose, galactose, sucrose, lactose, maltose, xylose, arabinose, sorbitol, mannitol, trehalose, raffinose or derivatives thereof. However, those skilled in the art will appreciate that it is possible to utilize different antifreezing agents without departing from the scope of the present invention. The antifreezing agents are commercially manufactured and available through various companies.

According to an embodiment, the chelating or complexing or sesquitering agents which are used in the aqeuous suspension composition include, but not limited to one or more of polycarboxylic acids such as polyacrylic acid and the various hydrolyzed poly(methyl vinyl ether/maleic anhydride); N-hydroxyethyliminodiacetic acid, nitrilotriacetic acid (NTA), N,N,N',N'-ethylenediaminetetraacetic acid, N-hydroxyethyl-N, N',N'-ethylenediaminetriacetic acid and N,N,N',N'',N''-diethylenetriaminepentaacetic acid; α-hydroxy acids, such as citric acid, tartaric acid and gluconic acid; orthophosphates, such as trisodium phosphate, disodium phosphate, monosodium phosphate; condensed phosphates, such as sodium tripolyphosphate, tetrasodium pyrophosphate, sodium hexametaphosphate and sodium tetrapolyphosphate; 5-sulfo-8-hydroxyquinoline; and 3,5-disulfopyrocatechol, polycarboxylates, ethylene diamine tetraacetic acid (EDTA), diethylenetriaminepentaacetic acid (DTPA), N-hydroxyethyl-ethylenediamine-triacetic acid (HEDTA), ethylenediaminediacetate (EDDA), ethylenediaminedi(o-hydroxyphenylacetic) acid (EDDHA), cyclohexane diamine tetraacetic acid (CDTA), polyethyleneaminepolyacetic acids, lignosulfonate, Ca—, K—, Na—, and ammonium lignosulfonates, fulvic acid, ulmic acid, nucleic acids, cyclodextrin, humic acid, pyrophosphate. However, those skilled in the art will appreciate that it is possible to utilize other chelating or complexing or sesquitering agents without departing from the scope of the present invention. The chelating or complexing or sesquitering agents are commercially manufactured and available through various companies.

According to an embodiment, the penetrant which is used in the aqeuous suspension composition include, but not limited to one or more of alcohol, glycol, glycol ether, ester, amine, alkanolamine, amine oxide, quaternary ammonium compound, triglyceride, fatty acid ester, fatty acid ether, N-methyl pyrrolidone, dimethylformamide, dimethylacetamide, or dimethyl sulfoxide, polyoxyethylenetrimethylolpropanemonooleate, polyoxyethylenetrimethylolprop anedioleate, polyoxyethylenetrimethylolpropanetrioleate, polyoxyethylenesorbitanmonooleate, polyoxyethylene sorbitol hexaoleate. However, those skilled in the art will appreciate that it is possible to utilize different penetrants without departing from the scope of the present invention. The penetrants are commercially manufactured and available through various companies.

According to an embodiment, the ultraviolet absorbent is selected from, but not limited to one or more of 2-(2'-hydroxy-5'-methylphenyl)benzotriazole, 2-ethoxy-2'-ethyloxazalic acid bisanilide, succinic acid dimethyl-1-(2-hydroxyethyl)-4-hydroxy-2,2,6,6-tetramethylpiperidine polycondensate, benzotriazole compounds such as 2-(2'-hydroxy-5'-methylphenyl)benzotriazole and 2-(2'-hydroxy-4'-n-octoxyphenyl)benzotriazole; benzophenone compounds such as 2-hydroxy-4-methoxybenzophenone and 2-hydroxy-4-n-octoxybenzophenone; salicylic acid compounds such as phenyl salicylate and p-t-butylphenyl salicylate; 2-ethylhexyl 2-cyano-3,3-diphenyl acrylate, 2-ethoxy-2'-ethyl oxalic bisanilide, and dimethyl succinate-1-(2-hydroxyethyl)-4-hydroxy-2,2,6,6-tetramethylpiperidine polycondensateor derivatives or the like. However, those skilled in the art will appreciate that it is possible to utilize different ultraviolet absorbents, without departing from the scope of the present invention. Such ultraviolet absorbents are commercially manufactured and available through various companies.

According to an embodiment, the UV ray scattering agents include, but not limited to titanium dioxide or the like may be used. However, those skilled in the art will appreciate that it is possible to utilize different UV ray scattering agents or mixtures thereof without departing from the scope of the present invention. Such UV ray scattering agents are commercially manufactured and available through various companies.

According to an embodiment, the humectant is selected from, but not limited to one or more of polyoxyethylene/polyoxypropylene copolymers, particularly block copolymers, such as the Synperonic PE series of copolymers available from Uniqema or salts, derivatives thereof. Other humectants are propylene glycol, monoethylene glycol, hexylene glycol, butylene glycol, ethylene glycol, diethylene glycol, poly (ethylene glycol), poly (propylene glycol), glycerol and the like; polyhydric alcohol compounds such as propylene glycol ether, derivatives thereof. Also other humectants include aloe vera gel, alpha hydroxyl acids such as lactic acid, glyceryl triacetate, honey, lithium chloride, etc. The non-ionic surfactants mentioned above also act as humectants. However, those skilled in the art will appreciate that it is possible to utilize other conventionally known humectants without departing from the scope of the present invention. The humectants are commercially manufactured and available through various companies.

According to an embodiment, the humectant is present in the range of 0.1% to 90% w/w of the total composition.

According to an embodiment, the humectant is present in the range of 0.1% to 70% w/w of the total composition. According to an embodiment, the humectant is present in the range of 0.1% to 60% w/w of the total composition. According to an embodiment, the humectant is present in the range of 0.1% to 50% w/w of the total composition. According to an embodiment, the humectant is present in the range of 0.1% to 30% w/w of the total composition. According to an embodiment, the humectant is present in the range of 0.1% to 10% w/w of the total composition.

The inventors have further determined that the composition of the present invention surprisingly has enhanced physical properties of dispersibility, suspensibility, flowability, wetting time, less viscosity, pourability, provides ease of handling and also reduces the loss of material while handling the product at the time of packaging as well as during field application. Surprisingly, the inventors have also determined that the crop nutrition and fortification composition in the form of liquid suspension and water dispersible granules display superior efficacy even when applied at reduced dosages of applications as compared to prior art composition.

Dispersibility of the water dispersible granular crop nutrition and fortification composition is a measure of percent dispersion. Dispersibility is calculated by the minimum percent dispersion. Dispersibility is defined as the ability of the granules to disperse upon addition to a liquid such as water or a solvent. To determine dispersibility of the granular composition as per the standard CIPAC test, MT 174, a known amount of the granular composition was added to a defined volume of water and mixed by stirring to form a suspension. After standing for a short period, the top nine-tenths are drawn off and the remaining tenth dried and determined gravimetrically. The method is virtually a shortened test of suspensibility and is appropriate for establishing the ease with which the granular composition dispersed uniformly in water.

According to an embodiment, the crop nutrition and fortification composition in the form of water dispersible granules exhibits almost instantaneous dispersion thus making the actives readily available to the crops.

According to an embodiment, the water dispersible granules have a dispersibility of at least 40%. According to an embodiment, the water dispersible granules have a dispersibility of at least 50%. According to an embodiment, the water dispersible granules have a dispersibility of at least 60%. According to an embodiment, the water dispersible granules have a dispersibility of at least 70%. According to an embodiment, the water dispersible granules have a dispersibility of at least 80%. According to an embodiment, the water dispersible granules have a dispersibility of at least 90%. According to an embodiment, the water dispersible granules have a dispersibility of at least 99%. According to an embodiment, the water dispersible granules have a dispersibility of 100%.

According to an embodiment, the crop nutrition and fortification composition exhibits good suspensibility. Suspensibility is defined as the amount of active ingredient suspended after a given time in a column of liquid, of stated height, expressed as a percentage of the amount of active ingredient in the original suspension. The water dispersible granules can be tested for suspensibility as per the CIPAC Handbook, "MT 184 Test for Suspensibility" whereby a suspension of known concentration of the granular composition in CIPAC Standard Water was prepared and placed in a prescribed measuring cylinder at a constant temperature, and allowed to remain undisturbed for a specified time. The top 9/10ths were drawn off and the remaining 1/10th was then assayed chemically, gravimetrically, or by solvent extraction, and the suspensibility was calculated.

The suspensibility of the liquid suspension is the amount of active ingredient suspended after a given time in a column of liquid, of stated height, expressed as a percentage of the amount of active ingredient in the original suspension. The suspensibility of liquid suspension concentrate is determined as per CIPAC MT-161 by preparing 250 ml of diluted suspension, allowing it to stand in a measuring cylinder under defined conditions, and removing the top nine-tenths. The remaining tenth is then assayed chemically, gravimetrically or by solvent extraction, and the suspensibility is calculated.

According to an embodiment, the crop nutrition and fortification composition in the form of water dispersible granules and liquid suspension has a suspensibility of at least 30%. According to an embodiment, the crop nutrition and fortification composition in the form of water dispersible granules and liquid suspension has a suspensibility of at least 40%. According to an embodiment, the crop nutrition and fortification composition has a suspensibility of at least 50%. According to an embodiment, the crop nutrition and fortification composition has a suspensibility of at least 60%. According to an embodiment, the crop nutrition and fortification composition has a suspensibility of at least 70%. According to an embodiment, the crop nutrition and fortification composition has a suspensibility of at least 80%. According to an embodiment, the crop nutrition and fortification composition has a suspensibility of at least 90%. According to an embodiment, the crop nutrition and fortification composition has a suspensibility of at least 99%. According to an embodiment, the crop nutrition and fortification composition has a suspensibility of 100%.

According to an embodiment, the crop nutrition and fortification composition in the form of water dispersible granules has almost no hardness. The hardness exhibited by the granules can be estimated by hardness testers such as the ones provided by Shimadzu, Brinell Hardness (AKB-3000 Model), Mecmesin, Agilent, Vinsyst, Ametek and Rockwell.

According to an embodiment, the crop nutrition and fortification composition in the form of water dispersible granules and liquid suspension demonstrates superior stability towards heat, light, temperature and caking. According to further embodiment, the stability exhibited by the crop nutrition and fortification composition is more than 3 years. According to further embodiment, the stability exhibited by the crop nutrition and fortification composition is more than 2 years. According to further embodiment, the stability exhibited by the crop nutrition and fortification composition is more than 1 year. According to further embodiment, the stability exhibited by the crop nutrition and fortification composition is more than 10 months. According to further embodiment, the stability exhibited by the crop nutrition and fortification composition is more than 8 months. According to further embodiment, the stability exhibited by the crop nutrition and fortification composition is more than 6 months.

Wettability is the condition or the state of being wettable and can be defined as the degree to which a solid is wetted by a liquid, measured by the force of adhesion between the solid and liquid phases. The wettability of the granular composition is measured using the Standard CIPAC Test MT-53 which describes a procedure for the determination of the time of complete wetting of wettable formulations. A weighed amount of the granular composition is dropped on water in a beaker from a specified height and the time for complete wetting was determined. According to another embodiment, the water dispersible granular composition has wettability of less than 2 minutes. According to another embodiment, the water dispersible granular composition has wettability of less than 1 minute. According to another embodiment, the water dispersible granular composition has wettability of less than 30 seconds.

According to an embodiment, the crop nutrition and fortification composition in the form of liquid suspension and water dispersible garnules passes the wet sieve retention test. The test is used to determine the amount of of non-dispersible material in formulations that are applied as dispersions in water. The wet sieve retention value of the crop nutrition and fortification composition in the form of liquid suspension and water dispersible granules is measured by using the Standard CIPAC Test MT-185 which describes a procedure for the measuring the amount of material retained on the sieve. A sample of the formulation is dispersed in water and the suspension formed is transferred to a sieve and washed. The amount of the material retained on the sieve is determined by drying and weighing.

According to an embodiment, the crop nutrition and fortification composition has a wet sieve retention value on a 75 micron sieve of less than 10%. According to an embodiment, the crop nutrition and fortification composition has a wet sieve retention value on a 75 micron sieve of less than 7%. According to an embodiment, the crop nutrition and fortification composition has a wet sieve retention value on a 75 micron sieve of less than 5%. According to an embodiment, the crop nutrition and fortification composition has a wet sieve retention value on a 75 micron sieve of less than 2%.

According to an embodiment, the crop nutrition and fortification composition in the form of liquid suspension is not highly concentrated and is easily pourable. The viscosity of a fluid is a measure of its resistance to gradual deformation by shear stress or tensile stress.

According to an embodiment, viscosity of the liquid suspension is determined as per CIPAC MT-192. A sample is transferred to a standard measuring system. The measurement is carried out under different shear conditions and the apparent viscosities are determined. During the test, the temperature of the liquid is kept constant. According to an embodiment, the The crop nutrition and fortification composition in the form of liquid suspension composition has a viscosity at 25° C. of about 10 cps to about 1200 cps which makes it pourable. According to an embodiment, the liquid suspension composition has viscosity at 25° C. of about 10 cps to about 500 cps. According to an embodiment, the liquid suspension composition has a viscosity at 25° C. of about less than 500 cps. According to an embodiment, the liquid suspension composition has viscosity at 25° C. of about 10 cps to about 400 cps. According to an embodiment, the liquid suspension composition has viscosity at 25° C. of about 10 cps to about 300 cps. Too viscous and highly concentrated composition tends to form a cake making it unpourable and thus is undesirable.

According to an embodiment, the crop nutrition and fortification composition in the form of water dispersible granules and liquid suspension demonstrates superior stability in terms of suspensibility under accelared storage condition (ATS). According to an embodiment, the crop nutrition and fortification composition demonstrates suspensibility of more than 90% under ATS. According to an embodiment, the crop nutrition and fortification composition demonstrates suspensibility of more than 80% under ATS. According to an embodiment, the crop nutrition and fortification composition demonstrates suspensibility of more than 70% under ATS. According to an embodiment, the crop nutrition and fortification composition demonstrates suspensibility of more than 60% under.ATS. According to an embodiment, the crop nutrition and fortification composition demonstrates suspensibility of more than 50% under ATS. According to an embodiment, the crop nutrition and fortification composition demonstrates suspensibility of more than 40% under ATS. According to an embodiment, the crop nutrition and fortification composition demonstrates suspensibility of more than 30% under ATS.

According to an embodiment, the invention relates to a process for preparing the crop nutrition and fortification composition comprising one ore more of iron salts, complexes, derivatives or mixtures thereof, elemental sulphur and at least one dispersing agent in the form of water dispersible granules. The the crop nutrition and fortification composition in the form of water dispersible granules is made by various techniques such as spray drying, fluidized bed granulation, extrusion, freeze drying etc.

According to an embodiment, the process of preparing a water dispersible granular composition involves milling a blend of one or more of iron salts, complexes, derivatives or mixtures thereof; with elemental sulphur, and at least one dispersing agent to obtain slurry or a wet mix. The composition further includes at least one fertilizers, at least least on additional active ingredient selected from micronutrients, macronutrients, biostimulants, pesticidal actives or mixtures thereof. The wet mix obtained is then dried, for instance in a spray dryer, fluid bed dryer or any suitable granulating equipment, followed by sieving to remove the under sized and oversized granules to obtain microgranules of the desired size.

According to another embodiment, the crop nutrition and fortification composition in the form of water dispersible granules is also made by dry milling one or more of iron salts, complexes, derivatives or mixtures thereof, elemental sulphur and at least one dispersing agent in an air mill or a jet mill to obtain the desired particle size in the range of 0.1 to 20 microns, preferably 0.1 to 10 microns. Water is added to the dry powder and the mixture is blended to obtain a dough or paste, which is then extruded through an extruder to obtain the granules of desired size.

According to another embodiment, the invention relates to a process for preparing the crop nutrition and fortification composition in the form of liquid suspension. According to further embodiment, the invention relates to a process for preparing the liquid suspension composition comprising one or more of iron salts, complexes, derivatives or mixtures thereof; and elemental sulphur, at least one structuring agent with at least one agrochemically acceptable excipient. The composition further includes at least one fertilizer, at least on additional active ingredient selected from micronutrients, macronutrients, biostimulants, pesticidal actives or mixtures thereof.

According to an embodiment, the process of preparing the liquid suspension composition involves homogenization of one or more of excipients by feeding them into a vessel provided with stirring facilities. The iron salts, complexes, derivatives or mixtures thereof; and elemental Sulphur are further added to the homogenised blend and stirred continuously for about 5 to 10 minutes until the total mixture becomes homogeneous. Subsequently, the suspension obtained is passed through the wet mill to obtain a particle size in the range of 0.1 to 20 microns, preferably 0.1 to 10 microns. Then, requisite quantity of the structuring agent is added to the obtained suspension, under continuous homogenization.

According to an embodiment, the invention further relates to the use of the crop nutrition or fortification composition as at least one of a nutrient composition, a crop strengthener composition, a soil conditioner composition, crop fortification, crop protection and a yield enhancer composition.

According to further embodiment, the invention also relates to the method of application of an effective amount of the crop nutrition and fortification composition including one or more of iron salts, complexes, derivatives or mixtures thereof, elemental sulphur and an agrochemical excipient, wherein the composition is applied to the seeds, seedlings, crops, a plant, plant propagation material, locus, parts thereof or to the surrounding soil.

According to an embodiment, the invention further relates to a method of improving the crop health, improving the crop nutrition by facilitating the uptake of essential nutrients, protecting the crop, enhancing the crop yield, strengthening the plant or conditioning the soil; the method comprising treating at least one of seeds, seedling, crops, a plant, plant propagation material, locus, parts thereof or to the surrounding soil with effective amount of the crop nutrition and fortification composition which includes one or more of iron salts, complexes, derivatives or mixtures thereof and elemental sulphur with at least one one agrochemically acceptable excipient.

The composition is applied through a variety of methods. Methods of applying to the soil includes any suitable method, which ensures that the composition penetrates the soil, for example, nursery tray application, in furrow application, drip irrigation, sprinker irrigation, soil drenching, soil injection, or incorporation into the soil, and such other methods. The composition also is applied in the form of a foliar spray.

The rates of application or the dosage of the composition depends on the type of use, the type of crops, or the specific active ingredients in the composition but is such that the agrochemical active ingredient, in an effective amount to provide the desired action (such as nutrient uptake plant vigor, crop yield).

A. PREPARATION EXAMPLES

The following examples illustrate the basic methodology and versatility of the composition of the invention. Source of iron is exemplified in the preparatory examples and can be replaced by any other water soluble or water insoluble iron salts, complexes or derivatives thereof. It should be noted that this invention is not limited to these exemplifications.

A. Water dispersible granular composition of iron salts and elemental sulphur

Example 1: Water dispersible granular composition of 23% ferric oxide and 55% Elemental sulphur: Water dispersible granular composition was prepared by blending 55 parts of elemental sulphur, 23 parts of Ferric oxide, 10 parts of Naphthalene sulphonate condensate, 8 parts of sodium lingo sulfonate, 4 parts of kaolinto obtain a blend. The blend obtained was milled to get a powder of less than 20 micron particle size. The powder was mixed with water in a suitable mixing equipment to form a slurry or wet mix.

The slurry obtained was wet ground in suitable wet grinding equipment. The wet milled slurry obtained was spray dried at an inlet temperature less than 175° C. and outlet temperature less than 90° C. to get a granular powder. The composition had the following particle size distribution: D10 less than 1.2 microns; D50 less than 3.5 microns and D90 less than 8.5 microns. The granule size of the composition is in the range of 0.1-1.5 mm. The composition has a dispersibility of 98%, suspensibility of 92%, wet sieve retention value of 0.8%, wettability of less than 30 sec and has almost no hardness. The composition further demonstrated suspensibility of about 86% under accelerated storage condition.

Example 2: Water dispersible granular composition of 70% Ferric sucrate and 20% Elemental sulphur: This composition was prepared similarly to Example 1 using 70 parts of Ferric sucrate, 20 parts of Elemental Sulphur, 4 parts of Naphthalene sulfonic acid, 4 parts of starch and 2 parts of silica. The composition had the following particle size distribution: D10 less than 1 micron; D50 less than 3.5 microns and D90 less than 10 microns. The granule size of the composition is in the range of 0.1-2.5 mm. The composition has a dispersibility of 52%, suspensibility of 55%, wet sieve retention value of 1.5% and wettability of less than 55 sec. The composition has almost no hardness. The composition further demonstrated suspensibility of about 57% under accelerated storage condition.

Example 3: Water dispersible granular composition of 14% Ferrous sulfate and 70% Elemental sulphur: This composition was prepared similarly to Example 1 using 14 parts of Ferrous sulfate, 70 parts of Elemental Sulphur, 6 parts of EO-PO block copolymer, 7 parts of naphthalene sulfonic acid and 3 parts of kaolin. The composition had the following particle size distribution: D10 less than 1.5 microns; D50 less than 2.3 microns and D90 less than 6.5 microns. The granule size range of the composition is in the range of 0.1-2.0 mm. The composition has a dispersibility of 65%, suspensibility of 68%, and wettability of less than 40 sec and wet sieve retention value of 3%. The composition does not have any hardness. The composition further demonstrated suspensibility of about 59% under accelerated storage condition.

Example 4: Water dispersible granular composition of 5% Ferrous fumarate and 85% Elemental sulphur: This composition was prepared similarly to Example 1 using 5 parts of Ferrous fumarate, 85 parts of Elemental Sulphur, 4 parts of sodium Naphthalene formaldehyde condensate, 6 parts of ligno sulfonate. The composition had the following particle size distribution: D10 less than 3.5 microns; D50 less than 6.5 microns and D90 less than 14 microns. The granule size of the composition is in the range of 0.1-1.5 mm. The composition has a dispersibility of 90%, suspensibility of 92%, and wettability of less than 60 sec, wet sieve retention value of 0.2%, wetting time of less than 35 sec and has almost no hardness. The composition further demonstrated suspensibility of about 85% under accelerated storage condition.

Example 5: Water dispersible granular composition of 2% Ferrosos ferric oxide ate and 90% Elemental sulphur: This composition was prepared similarly to Example 1 using 2 parts of Ferrosos ferric oxide, 90 parts of Elemental Sulphur, 4 parts of sodium alkyl benzene sulfonate, 2 parts of sodium salt of polycarboxylic acid and 2 parts of perlite. The composition had the following particle size distribution: D10 less than 2.6 microns; D50 less than 4 microns and D90 less than 10 microns. The granule size of the composition is in the range of 0.1-1.5 mm. The composition has a dispersibility of 95%, suspensibility of 98%, wettability of less than 40 sec, wet sieve retention value of 0.2% and has almost no hardness. The composition further demonstrated suspensibility of about 85% under accelerated storage condition.

B. Liquid Suspension Compositions of Iron Salts and Elemental Sulphur:

Example 6: Liquid Suspension composition of 1.5% Iron oxide and 55% Elemental sulphur. Liquid suspension composition was prepared by mixing 1.5 parts of Iron oxide, 55 parts of Elemental sulphur, 6 parts of naptahlene sulfonate condensate, 5 parts of propylene glycol, 29.5 parts of water and homogenised by feeding them into a vessel provided with stirring facilities until the total mixture was homogeneous. Subsequently, the suspension obatined was passed through the wet mill to obtain a suspension with less than 20 microns particle size. Then, 3 part of gum arabic (3%) was added under continuous homogenization to obtain the suspension concentrate. The composition has the particle size distribution of about D10 less than 2.5 microns; D50 less than 3.9 microns and D90 less than 6.2 microns. The sample has suspensibility of about 95%, viscosity of about 750 cps. The composition has suspensibility of about 89% under accelerated storage condition.

Example 7: Liquid Suspension composition of 11.5% Ferric oxide and 27.5% Elemental sulphur: This composition was prepared similar to Example 6 using 11.5 parts of Ferric oxide, 27.5 parts of Elemental Sulphur, 10 parts of Napthalene Sulphonate condensate, 2 parts of glycerol monolaurate, 12 parts of polyethylene glycol, 3 parts of 3% solution of gum Arabic and 34 parts of water. The composition has the particle size distribution of about D10 less than 3.5 microns; D50 less than 3.5 microns and D90 less than 10 microns. The sample has suspensibility of about 96%, viscosity of about 380 cps. The composition has suspensibility of about 89% under accelerated storage condition.

Example 8: Liquid Suspension composition of 45% Ferrous glycinate and 5% Elemental sulphur: This composition was prepared similar to Example 6 using 45 parts of Ferrous glycinate, 5 parts of Elemental Sulphur, 6 parts of polycarboxylic acid, 1 part of Sorbitan monolaurate, 6 parts of ethylene glycol, 4 parts of 3% solution of guar gum and 33 parts of water. The composition has the particle size distribution of about D10 less than 2.5 microns; D50 less than 5 microns and D90 less than 13 microns. The sample has suspensibility of about 56%, viscosity of about 450 cps. The composition has suspensibility of about 44% under accelerated storage condition.

Example 9: Liquid Suspension composition of 25% Ferric oxide and 28% Elemental sulphur: This composition was prepared similar to Example 6 using 25 parts of Ferric oxide, 28 parts of Elemental Sulphur, 8 parts of sodium Naphthalene formaldehyde condensate, 3 part of glycerol monolaurate, 4 parts of Propylene glycol ether, 3 parts of 3% solution of xanthan gum, 29 parts of water. The composition has the particle size distribution of about D10 less than 1.5 microns; D50 less than 3.5 microns and D90 less than 9 microns. The sample has suspensibility of about 96%, viscosity of about 320 cps. The composition has suspensibility of about 90% under accelerated storage condition.

Example 10: Liquid Suspension composition of 8.7% Ferrous sulfate and 50% Elemental sulphur: This composition was prepared similar to Example 6 using 8.7 parts of Ferrous sulfate, 50 parts of Elemental Sulphur, 4 parts of Napthalene Sulphonate, 1.3 part of Sorbitan monolaurate, 3 parts of glyceryl triacetate, 2 parts of 3% solution of tragacanth gum, 31 parts of water. The composition has the particle size distribution of about D10 less than 1.5 microns; D50 less than 4 microns and D90 less than 9 microns. The sample has suspensibility of about 78%, viscosity of about 300 cps. The composition has suspensibility of about 71% under accelerated storage condition.

Field Study:

Experiment 1: To study effect of water dispersible granules or Suspension concentrate of Elemental sulphur and Ferric oxide on Groundnut:

Field trial was conducted for the evaluation of an embodiment of the composition of the present invention at Idaar, Gujarat on Groundnut crop. The trials were laid down in Randomized Block Design (RBD) with six treatments including untreated control, replicated four times. For each treatment, plot size of 35sq.m (7 m×5 m) was maintained. The test nutritional compositions, Sulphur and Ferric oxide in the form of WDG, SC and Pastilles at prescribed dose were applied as basal application at the time of sowing of groundnut crop. The details of the experiment are as follows:

a) Trial Location: Idaar, Gujarat
b) Crop: Groundnut (var: GG 20)
c) Experiment season: Kharif 2018
d) Trial Design: Randomized Block Design
e) Replications: Four
f) Treatment: Six
g) Plot size: 7 m×5 m=35 sq.m
h) Date of Application: 22 Jan. 2018
i) Date of sowing: 23 Jan. 2018
j) Method of application: Basal
k) Date of Harvesting: 4 Jun. 2018

The observations were recorded at the harvesting time and the mean data were presented in Table 1 to enumerate the efficacy of the water dispersible granules or Suspension concentrate of Elemental sulphur and Ferric oxide.

TABLE 1

To study effect of combination of Water dispersible granules or Suspension concentrate of Elemental sulphur and Ferric oxide:

| Treatment details | Dose of nutrient salt in g/acre | | Av. No. of pods/plant | % pod increase over untreated | Expected % pod increases | 100 pod weight (in gm) | Pod yield (kg/Acre) |
| --- | --- | --- | --- | --- | --- | --- | --- |
| | S | Fe | | | | | |
| T1-Untreated | — | — | 38.9 | — | — | 140.1 | 1691.41 |
| T2-Ferric oxide-23% (Fe-16%) WDG | — | 800 | 43.5 | 11.8 | — | 143.7 | 1853.14 |
| T3-Sulphur 90% WDG | 2750 | — | 46.2 | 18.8 | — | 150.5 | 1951.37 |
| T4-Sulphur (S-55%) + Ferric oxide-23% (Fe-16%) Pastilles | 2750 | 800 | 48.1 | 23.7 | 28.4 (0.83)* | 150.9 | 2001.91 |
| T5-Sulphur (S-55%) + Ferric oxide-23% (Fe-16%) WDG according | 2750 | 800 | 53.2 | 36.8 | 28.4 (1.30)* | 155.1 | 2322.03 |

TABLE 1-continued

To study effect of combination of Water dispersible granules or
Suspension concentrate of Elemental sulphur and Ferric oxide:

| Treatment details | Dose of nutrient salt in g/acre | | Av. No. of pods/plant | % pod increase over untreated | Expected % pod increases | 100 pod weight (in gm) | Pod yield (kg/Acre) |
|---|---|---|---|---|---|---|---|
| | S | Fe | | | | | |
| to an embodiment of the present invention T6-Sulphur (S-27.5%) + Ferric oxide-11.5% (Fe-8%) SC according to an embodiment of the present invention | 2750 | 800 | 52.9 | 36 | 28.4 (1.27)* | 153.6 | 2234.12 |

*Synergy factor
*The iron salt selected and the concentration used is exemplarly and can be replaced with other iron salt with different concentrations as claimed in the present invention.

From the data observed in the table 1, it can be concluded that the compositions T5, T6 as per the embodiments of the present invention demonstrate synergistic behavior.

"Synergy" is as defined by Colby S. R. in an article entitled "Calculation of the synergistic and antagonistic responses of herbicide combinations" published in Weeds, 1967, 15, p. 20-22. The action expected for a given combination of two active components can be calculated as follows:

$$E = X + Y - (XY/100)$$

Where,
E=Expected % effect by mixture of two products X and Y in a defined dose.
X=Observed % effect by product A
Y=Observed % effect by product B The synergy factor (SF) is calculated by Abbott's formula (Eq. (2)(Abbott, 1925).

SF=Observed effect/Expected effect

Where, SF>1 for Synergistic reaction; SF<1 for antagonistic reaction; SF=1 for additive reaction.

When the percentage of yield effect observed (E) for the combination is greater than the expected percentage, synergistic effect of the combination can be inferred. When the percentage of yield effect observed for the combination is equal to the expected percentage, merely an additive effect may be inferred, and wherein the percentage of yield effect observed for the combination is lower than the expected percentage, an antagonistic effect of the combinations can be inferred.

It can be observed that the synergy factor is 1.30 and 1.27 for treatments T5 and T6 as seen from Table 1 which depicts that the WDG and SC compositions of elemental sulphur and Ferric oxide is synergistic in nature. This synergistic behavior of Sulphur+Ferric oxide in the form of WDG and SC as per embodiment of the present invention can be observed from the pod yield of groundnut crops. The three treatments namely T4 (Sulphur-55%+Ferric oxide 23% Pastilles), T5 (Sulphur-55%+Ferric oxide 23% WDG) and T6 (Sulphur-27.5%+Ferric oxide-11.5% SC) were applied at same active dosage i.e 2750 gm/acre of sulphur and 800 gm/acre of iron. Treatments T5 and T6 exhibits highest pod yield of about 2322 kg/acre and 2234 kg/acre respectively when compared to treatment T4 with a pod yield -2001 kg/acre, Ferric oxide WDG (pod yield -1853 kg/acre), sulphur 90% WDG treatment (pod yield -1951 kg/acre). Thus, the combination of Elemental sulphur and Ferric oxide in WDG and SC form as per embodiment of the present invention is synergistic and provides higher crop yield as compared to combination of elemental sulphur and ferric oxide in the form of pastilles.

Experiment 2: To study the effect of Elemental sulphur and Ferric oxide in the form of WDG and SC on availability of Sulphur and Iron.

The pot trial experiments were carried out to observe the effect of Elemental sulphur and Ferric oxide in the form of WDG and SC on Sulphur and Iron nutrient availability (Oxidation) in soil over a period of time.

The earthen pots were field with two kilogram sandy loam soil and kept in five sets to draw the samples at 3, 20, 40, 60 and 80 days with three treatment and three replication. The treatment details are as follows:

T1—S 55%+23% Ferric oxide WDG (Fe-16%)
T2—S 55%+Fe 23% Ferric oxide Pastilles (Fe-16%)
T3—S-27.5%+Ferric oxide-11.5% (Fe-8%)

2 gm each of Sulphur and Feric oxide combination i.e. T1—S 55%+23% Ferric oxide WDG (Fe-16%), T2—S 55%+Fe 23% Ferric oxide Pastilles (Fe-16%), and 4 gm of T3—S-27.5%+Ferric oxide-11.5% (Fe-8%) SC poured into respective treatment pots and mixed well for each treatment replication wise. The experimental pots were kept at 28° C.±2° C. temperature and sufficient moisture was maintained during entire experiment. The 100 g samples from first set of the treatment (i.e. 3 days after treatment) was drawn for assessment of S and Fe availability (oxidation) in soil at 3 days and similarly soil samples was drawn at 20 days, 40 days, 60 days and 80 days from 2, 3, 4 and 5th sets of pots respectively.

The comparative oxidation of S and Fe nutrient from different treatments was assessed and presented in the FIGS. 1 and 2 to observe the S and Fe nutrients availability status over a period of time.

From, FIG. 1 and FIG. 2, it can be observed that, availability of Sulphur and Iron with respect to WDG and SC composition prepared according to an embodiment of the present invention is greater than those observed with the Pastilles. It is noted that sulphur and iron are made immediately available to the crops whereas pastilles comparatively takes time to meet the nutritional requirement of the crop. It can be observed from FIGS. 1 and 2 that sulphur and iron were available for uptake immediately after application in the form of WDG or SC composition whereas very little amount of Sulphur, iron was released from pastilles even after 3 days of application. From, FIG. 1 it can be seen that, 20 days after treatment, about 114 ppm and 98 ppm of sulphur was available for uptake with respect to the WDG and SC composition of sulphur and ferric oxide whereas only 28 ppm of sulphur was available for uptake to the plants when applied in the form of pastilles. Also, from FIG. 2 it can be observed that, 20 days after treatment about 14.22 ppm and 12.2 ppm of Iron was available for uptake with respect to the WDG and SC composition of sulphur and ferric oxide whereas only 4.5 ppm of iron was available for uptake to the plants when the combination is applied in the form of Pastilles.

Further, similar trends of availability of Sulphur and Iron were observed with the combination of Sulphur and Ferric oxide in the form of WDG and SC prepared as per the embodiments of the present invention when compared to Pastilles even after 40, 60 days of treatment. Thus, water dispersible granular and suspension concentrate compositions of Elemental sulphur and Ferric oxide as per the embodiments of the present invention in the size range of 0.1-20 microns provided significantly higher amount of Sulphur and Iron available for uptake in comparison to the Sulphur and Ferric oxide pastilles. Thus, it indicates that a composition of Sulphur and Ferric Oxide in the form of a water dispersible granular and suspension concentrate compositions prepared according to the embodiment of the present invention shows high nutrient use efficient fertilizer and therefore required low dose to meet sulphur and iron nutrient requirement of plant.

Experiment 3: To study the effect of Elemental sulphur and different Iron salts on groundnut:

The field trials were carried out to observe the effect of different formulation of Elemental Sulphur and Iron salts on yield and yield attributing parameters in commercially cultivated groundnut field at Gujarat.

The trial was laid out during kharif season in Randomized Block Design (RBD) with ten treatments including untreated control, replicated thrice. For each treatment, plot size of 35 sq.m (7 m×5 m) was maintained. The Groundnut crop in trial field was raised followed good agricultural practice. The experimental details are as mentioned below:

Details of Experiment
a) Trial Location: Himatnagar, Gujarat
b) Crop: Groundnut var: GG 20)
c) Experiment season: Kharif 2018
d) Trial Design: Randomized Block Design
e) Replications: three
f) Treatment: ten
g) Plot size: 7 m×5 m=35 sq.m
h) R×P spacing: 30 cm×15 cm
h) Date of sowing: 3 Jul. 2018
i) Date of Application: 3 Jul. 2018
j) Method of application: Basal
k) Date of Harvesting: 14 Oct. 2018

The observations on different parameters of yield and yield attributing factors, sulphur and iron concentration in plant, chlorophyll content in leaves, shelling percentage and oil content were recorded at the harvesting time and mean data were presented in Table 2 to enumerate the impact of different formulation of combination of Elemental sulphur and Iron salts.

TABLE 2

Field data for combination of Elemental sulphur and iron salts in Water dispersible granular (WDG), Suspension concentrate (SC) on Groundnut crop.

| Treatment details | Dose of nutrient salt in g/acre S | Fe | Nutrient concentration in Plant S (in %) | Fe (in ppm) | Total Chlorophyll (mg/g dry wt of leaves) | Pod yield (kg/Acre) | % Yield increase over untreated | Shelling % | 100 seed wt (g) | % oil content |
|---|---|---|---|---|---|---|---|---|---|---|
| T1-S-70% + 14% Ferrous sulphate (Fe-5%) WDG according to an embodiment of the present invention | 3500 | 250 | 0.321 | 147 | 4.58 | 1876.1 | 17.3 | 70.8 | 48.2 | 43.1 |
| T2-S-55% + Ferric oxide-23% (Fe-16%) WDG according to an embodiment of the present invention | 2750 | 800 | 0.291 | 163 | 4.94 | 1958.8 | 22.5 | 71.4 | 48.7 | 44.9 |
| T3-S-20% + Ferric sucrate-70% (Fe-35%) WDG according to an embodiment of the present invention | 1000 | 1750 | 0.237 | 183 | 4.96 | 1916.6 | 19.8 | 70.5 | 47.9 | 43.5 |
| T4-S - S-70% +14% Ferrous sulphate (Fe-5%) Pastilles | 4000 | 250 | 0.178 | 112 | 3.98 | 1699.4 | 6.3 | 69.2 | 47.2 | 42 |
| T5-S-55% + Ferric oxide-23% (Fe-16%) Pastilles | 2750 | 800 | 0.154 | 115 | 3.75 | 1700.7 | 6.3 | 68.8 | 47.6 | 42.2 |
| T6-S-20% + Ferric sucrate-70% (Fe-35%) Pastilles | 1000 | 1750 | 0.153 | 117 | 4.11 | 1706.3 | 6.7 | 69.4 | 46.5 | 42.3 |
| T7-S-50% + Ferrous sulfate 8.7% (Fe-3.108%) SC according to an embodiment of the present invention | 4000 | 249 | 0.301 | 152 | 4.56 | 1801.2 | 12.6 | 70 | 48 | 43.3 |
| T8-S-27.5% + Ferric oxide 11.5% (Fe-8%) SC according | 2750 | 800 | 0.286 | 159 | 5.03 | 1938.0 | 21.2 | 69.3 | 48.2 | 43.9 |

TABLE 2-continued

Field data for combination of Elemental sulphur and iron salts in Water dispersible granular (WDG), Suspension concentrate (SC) on Groundnut crop.

| Treatment details | Dose of nutrient salt in g/acre | | Nutrient concentration in Plant | | Total Chlorophyll (mg/g dry wt of leaves) | Pod yield (kg/Acre) | % Yield increase over untreated | 100 Shelling % | % seed wt (g) | % oil content |
|---|---|---|---|---|---|---|---|---|---|---|
| | S | Fe | S (in %) | Fe (in ppm) | | | | | | |
| to an embodiment of the present invention T9-S-10.5% + Ferric sucrate-35% (Fe-17.5%) SC according to an embodiment of the present invention | 1000 | 1750 | 0.259 | 178 | 4.98 | 1927.2 | 20.5 | 69.8 | 47.8 | 44.1 |
| T10-Untreated | — | — | 0.148 | 110 | 3.78 | 1599.4 | 0 | 69.1 | 47.3 | 42.1 |
| CD (at 0.5%) | — | — | 0.057 | 32.5 | 0.73 | 144.5 | — | 1.52 | 0.82 | 1.87 |

It can be appreciated from the observed results presented in Table 2 that, amongst the different combinations of Elemental Sulphur (E.S) and Iron salts formulated in a water dispersible granule (WDG), Pastilles and suspension concentration (SC) were tested in the field for its effects on chlorophyll content, pod yields, shelling percent and oil content in kernels of groundnut. The application of the selected treatments revealed that the composition of E.S+Iron salt in the form of a water dispersible granule as per embodiment of the present invention and suspension concentrate as per embodiment of the present invention at different concentrations exhibits significantly good results as compared to E.S+Iron salt Pastilles and the untreated plots.

It was noted that the combination of Elemental sulphur and iron salts in the form of water dispersible granules or suspension concentrate demonstrates better uptake of sulphur and iron when compared to combination of elemental sulphur and iron salts in the form of pastilles. The uptake of Fe with T2 (Sulphur-55%+Ferric oxide 23% WDG), T5 (Sulphur-55%+Ferric oxide 23% Pastilles) and T8 (Sulphur-27.5%+Ferric oxide 11.5% SC) was recorded as 163 ppm, 115 ppm and 152 ppm respectively as can be observed from Table 2. It can be further noted that on comparing Treatments T2, T5 and T8 which is applied at the same dosage, Treatments T2 and T8 according to an embodiment of the present invention demonstrated better uptake of S and Iron as compared to Treatment T5

It can be more appreciated from the observed results that chlorophyll contents in groundnut plant leaves was higher in WDG and SC of elemental sulphur and iron salts as compared to the pastilles. It can be noted that on comparing treatments T1, T4 and T7, Treatments T1 and T7 had a chlorophyll content of 4.58 and 4.56 respectively whereas treatment T4 had a chlorophyll content of about 3.98. Thus, the leaves of groundnut plot treated with treatments T1 and T7 were greener as compared to Treatment T4 and the untreated plot. The untreated control also had chlorophyll content of about 3.78. Yellow leaves were observed with plot treated with T4 and untreated plot.

Further, surprisingly it was observed that plots treated with E.S+Iron salts in the form of WDG and SC formulations exhibited significantly higher pod yield, shelling percentage and oil content in groundnut as compared to plots treated with E.S+Iron salts in form of pastilles. It can be observed that from treatments T1, T4 and T7 applied at same dosage wherein treatments T1 and T7 had higher pod yield, oil content, seed weight as compared to treatment T4. Similarly on comparing T2, T5, T8 and T3, T6, T9 it was noted that treatments T2, T8 had about 22% and 21% yield increase respectively as compared to treatment T5 which had about 6.3% yield increase over the untreated plot whereas treatments T3 and T9 had about 19.8% and 20.5% yield increase respectively as compared to T6 which had about 6.7% yield increase over untreated plot. Similar trend is observed with respect to other tested parameters as seen from Table 2. It should be noted that even at different dosages, combination of elemental sulphur and Iron salts in WDG and SC as per embodiment of the present invention when compared to the pastille form demonstrated significantly higher pod yield, uptake of sulphur and iron, oil content, seed weight.

It was observed that apart from the iron salts listed in the Table above, other iron salts as claimed in the present application also showed a synrgeistic effect in combination with elemental sulfur at the claimed concentration ranges of the present invention.

Experiment 4: Field Efficacy data of Elemental Sulphur and Ferric oxide WDG and SC composition on Tomato crop.

The trial was laid out during kharif season in Randomized Block Design (RBD) with six treatments including untreated control, replicated thrice at Jaulkedindori, Nashik. For each treatment, plot size of 35 sq.m (7 m×5 m) was maintained. The Tomato crop in trial field was raised followed good agricultural practice. The Sulphur and Ferric oxide combinations in different types of formulation with prescribed dose were applied as basal application at the time of sowing.

The yield data were recorded at the harvesting time and mean data were presented in tables 3 to enumerate the impact of different of combination of Elemental sulphur and Ferric oxide.

TABLE 3

Efficacy data of Elemental Sulphur and Ferric oxide WDG or SC composition on Tomato crop.

| Treatment details | Dose of nutrient salts in g/acre | | Tomato weight (Kg/plot) | Tomato Yield (in kg/acre) | % Yield increase |
|---|---|---|---|---|---|
| | S | Fe | | | |
| T1-S-55% + 32% Ferric oxide (Fe-22%) WDG | 2200 | 880 | 660.1 | 48894.8 | 27.5 |

TABLE 3-continued

Efficacy data of Elemental Sulphur and Ferric oxide WDG or SC composition on Tomato crop.

| Treatment details | Dose of nutrient salts in g/acre | | Tomato weight (Kg/plot) | Tomato Yield (in kg/acre) | % Yield increase |
|---|---|---|---|---|---|
| | S | Fe | | | |
| according to an embodiment of the present invention T2-S-48% + Ferric oxide-8.6% (Fe-6%) SC according to an embodiment of the present invention | 2200 | 880 | 579.8 | 42950.2 | 12 |
| T3-Ferrous sulfate (Fe-19%) Powder | — | 4750 | 525.2 | 38903.1 | 1.4 |
| T4-Sulphur 90% WDG | 2750 | — | 532 | 39044.3 | 1.8 |
| Untreated | — | — | 517.8 | 38355.2 | 0 |

From Table 3, it can be observed that treatments T1 and T2 prepared according to an embodiment of the present invention demonstrated better yield as compared to treatments T3, T4 and the untreated plot. Treatments T1 and T2 depicted yield increase of about 24% and 12% at reduced dosage when compared to treatment T3 (commercially available) which had yield increase of only 1.4% and treatment T4 (commercially available) which had yield increase of only 1.8%. Thus, it can be concluded that even at reduced dosage, the combination of elemental sulphur and Ferric oxide (treatment T1 and T2) in the form of WDG and SC as per the embodiment of the present invention shows significant improvement in fruit weight, fruit yield than that of the individual nutrient powder (treatments T3, T4).

Experiment 5: To assess synergistic effect of different formulation of Elemental Sulphur+Ferric oxide on Sugarcane.

The field trials were carried out to study the effect of different formulations of Elemental sulphur+Ferric oxide on chlorophyll content in the leaves and yield in commercial cultivated Sugarcanefield at Naysari, Gujarat.

The trial was laid out during kharif season in Randomized Block Design (RBD) with six treatments including untreated control, replicated four times. For each treatment, plot size of 50 sq.m (10 m×5 m) was maintained. The test nutritional compounds, Sulphur and Ferric oxide alone and its different formulation with prescribed dose were applied as basal application in furrow at the time of sugarcane planting. The Sugarcane crop in trial field was raise followed good agricultural practice.

Details of Experiment
a) Trial Location: Naysari, Gujarat
b) Crop: Sugarcane (var: COJ 238)
c) Experiment season: Kharif 2018
d) Trial Design: Randomized Block Design
e) Replications: Four
f) Treatment: Six
g) Plot size: 10 m×5 m=50 sq.m
h) Date of Application: 3 Jan. 2018
i) Date of sowing: 5 Jan. 2018
j) Method of application: Basal
k) Date of Harvesting: 6 Feb. 2019

The observations on chlorophyll content at 90 days after planting and cane yield at harvest were recorded and mean data were presented in table 4 to enumerate the impact the combination of sulphur and Ferric oxide alone and its different combination formulation on chlorophyll content and cane yields.

TABLE 4

To assess the effect of Elemental Sulphur and Ferric oxide WDG or SC on Sugarcane

| Treatment details | Dose of nutrient salt in g/acre | | Total Chlorophyll (mg/g dry wt of leaves) | % chlorophyll increase over untreated | Cane yield (Qtl/Acre) | % cane yield increases over control |
|---|---|---|---|---|---|---|
| | S | Fe | | | | |
| T1-Untreated | — | — | 4.6 | — | 386.5 | — |
| T2-Ferric oxide (Fe-16%) WDG | — | 800 | 6.2 | 34.8 | 412.6 | 9.7 |
| T3-Sulphur 90% WDG | 2750 | — | 5.1 | 10.9 | 409.7 | 8.9 |
| T4-Sulphur (S-55%) + Ferric oxide-23% (Fe-16%) Pastilles | 2750 | 800 | 5.7 | 23.9 (41.9)* | 421.3 | 12 |
| T5-Sulphur (S-55%) + Ferric oxide-23% (Fe-16%) WDG according to an embodiment of the present invention | 2750 | 800 | 6.9 | 50.0 (41.9)* | 449.5 | 19.5 |
| T6-S-27.5% + Ferric oxide 11.5% (Fe-8%) SC according to an embodiment of the present invention | 2750 | 800 | 6.8 | 47.8 (41.9)* | 439.2 | 16.7 |

*Calculated/Expected chlorophyll increase

It can be observed from the data presented in the Table 4 that the combination of Elemental sulphur and Ferric oxide in the form of WDG and SC provides good yield than the composition in pastilles form and the untreated plot thus exhibiting synergy. The plots treated with treatments T5, T6 depicted higher chlorophyll content in comparison to the plots treated with treatments T2, T3, T4. The chlorophyll content with treatments T5, T6 was about 6.9 and 6.8 respectively whereas with treatment T2, T3, T4 it was about 6.2, 5.1 and 5.7 respectively. Thus, it shows that the synergistic combination of elemental sulphur and Iron salts in the form of WDG, SC help in improving chlorophyll content due to improved photosynthesis and ultimately reduces yellowing of leaves which is observed due to Iron deficiency in the crops. On comparing treatment T2, T3, T4, T5 about 19.5% yield increase was observed with treatment T5. Treatment T2, T3, T4 demonstrated about 9.7%, 8.9% and 12% yield increase respectively. Similarly treatment T6 demonstrated yield increase of about 16.7%. T5 and T6 demonstrates significantly higher yield which is 19.5% and 16.7% respectively as compared to the other treatments. Thus, more green leaves and significantly higher yield was observed with the combination of Elemental sulphur and Ferric oxide in WDG and SC form than the individual treatment and the combination in pastilles form.

Experiment No 6: To study impact of different formulation of Sulphur+Ferric oxide on dry root rot disease (caused by Macrophominaphaseolina) control in groundnut.

Field experiment methodology:

The field trials were carried out to observe the effect of different formulations of Sulphur+Ferric oxide on dry root rot disease control in Groundnut at Sikar, Rajasthan. The trial was laid out during kharif season in Randomized Block Design (RBD) with six treatments including untreated control, replicated four times. For each treatment, plot size of 50 sq.m (10 m×5 m) was maintained. The test product compounds, Sulphur and Ferric oxide alone and its different combination formulation with prescribed dose were applied as basal application in furrow at the time of sowing of groundnut seed. The groundnut crop in trial field was raised following good agricultural practices. The groundnut seed was treated with insecticide Thiamethoxam 30% FS to prevent the soil born insect damage of the crops. The seed of groundnut, variety RG 425, were used for the study and planted in 35 cm row to row and 15 cm plant to plant spacing.

Details of Experiment
a) Trial Location: Sikar, Rajasthan
b) Crop: Groundnut (var: RG 425)
c) Experiment season: Kharif 2018
d) Trial Design: Randomized Block Design
e) Replications: Four
f) Treatment: Six
g) Plot size: 10 m×5 m=50 sq.m
h) Date of sowing: 22 Jun. 2018
i) Date of Application: 22 Jun. 2018
j) Method of application: Basal in Furrow
k) Date of Harvesting: 7 Sep. 2018

The observations on plant mortality due to dry root rot disease caused by Macrophominaphaseolina were recorded at 30, 45 and 60 days after sowing of the seed from 3 sq. m area demarcated randomly in each plot immediate after sowing of groundnut seed. The dead plants due to dry root rot which was counted at 30, 45 and 60 days were summed up and percent disease control was calculated using following formula.

The mean data of plant mortality and percent disease control is presented in Table 5.

Disease Control (%)=[Plant mortality in control plant−Plant mortality in treated plant)/Plant Mortality in control plant]×100

TABLE 5

To assess the effect of different formulation of Sulphur (S-55%) + Ferric oxide-23% (Fe-16%) in Groundnut

| Treatment details | Dose of nutrient salt in g/acre | | Plant mortality due to dry root rot * | | | | % Disease control |
|---|---|---|---|---|---|---|---|
| | S | Fe | 30 DAS | 45 DAS | 60 DAS | Total | |
| T1-Untreated | — | — | 3.3 | 5.8 | 4.5 | 13.5 | 0 |
| T2-Ferric oxide 23% (Fe-16%) WDG | — | 800 | 2.8 | 4.8 | 3.75 | 11.3 | 16.7 |
| T3-Sulphur 90% WDG | 2750 | — | 2.5 | 3.8 | 3.25 | 9.6 | 29.3 |
| T4-Sulphur (S-55%) + Ferric oxide-23% (Fe-16%) Pastills | 2750 | 800 | 3.0 | 4.5 | 2.3 | 9.8 | 27.8 |
| T5-Sulphur (S-55%) + Ferric oxide-23% (Fe-16%) WDG according to an embodiment of the present invention | 2750 | 800 | 1.5 | 2.5 | 2.0 | 6.0 | 55.6 |
| T6-Sulphur (S-55%) + Ferric oxide-23% (Fe-16%) SC according to an embodiment of the present invention | 2750 | 800 | 1.8 | 2.8 | 1.8 | 6.3 | 53.7 |
| CD at 0.5% | — | — | — | — | — | — | 5.67 |

*Mean of four replications

From the data represented in Table 5, it can be observed that treatment T5 (S−55%+Ferric oxide−23% WDG) according to an embodiment of the present invention appears most effective treatment to control the dry root rot disease in groundnut followed by treatment T6 (S−55%+Ferric oxide−23% SC) according to an embodiment of the present invention. It was observed that the % disease control with T5 and T6 was about 55.6% and 53.7% respectively whereas with treatment T4 it was about 27.8%. The disease control with T3 and T2 was about 29.3% and 16.7% respectively. It was noted that the superior efficacy with WDG formulation is because of instant dispersibility of the product in water which helps cover the entire surface surrounding the root rhizosphere, making the crop stronger enough to inhibit the growth of dry root rot pathogen. Thus, the elemental sulphur and iron oxide combination in the form of water dispersible granules and suspension concentrate with a particle size in the range of 0.1 to 20 microns help in controlling the dry root rot disease in groundnut.

Experiment No 7: To assess the impact of particle size distribution in the composition comprising Sulphur+Ferric oxide on rice yield.

Field Experiment Methodology:

The field trials were carried out to observe the effect of different ranges of particle size of composition of Sulphur+Ferric oxide on yield of rice at Chiloda, Gandhinagar.

The trial was laid out during Kharif season in Randomized Block Design (RBD) with seven treatments including untreated control, replicated four times. For each treatment, plot size of 40 sq.m (8 m×5 m) was maintained. The test products with prescribed dose were applied as top dressing at 15 days after transplanting of the paddy. The paddy crop in trial field was raised following good agricultural practice. The seeds of paddy variety Gurjari, were used for raising the nursery and 25 days old nursery was used for transplanting the trial field in 30 cm row to row and 25 cm plant to plant spacing.

Details of Experiment
a) Trial Location: Chiloda, Gandinagar
b) Crop: Rice (var: Gurjari)
c) Experiment season: Kharif 2018
d) Trial Design: Randomized Block Design
e) Replications: Four
f) Treatment: 5
g) Plot size: 8 m×5 m=40 sq.m
h) Date of transplanting: 18 Jul. 2018
i) Date of Application: 3 Aug. 2018
j) Method of application: Top dressing
k) Date of Harvesting: Feb. 2 Nov. 2018

The observations on yield were recorded at the time of harvesting and mean data is presented in Table 1 to observe the impact of different treatments on grain yield of rice microns). It was observed that the % yield increase with T3, T4 and T5 was about 13.1%, 16.6% and 9.1% respectively whereas with treatment T2 it was 21.1%. It can be noted that on comparing Treatments T2, T3, T4 and T5 having WDG formulations with same concentrations of actives and also applied at same dosages, T2 with specific particle size distribution of 0.1-20 microns prepared according to an embodiment of the present invention, demonstrated superior efficacy as compared to T3, T4 and T5 with different particle size distributions. Thus, it was surprisingly noted that even amongst WDG formulations, superior efficacy was observed with WDG formulation having specific particle size distribution of 0.1-20 microns in comparison to WDG formulations having different particle sizes in varied ranges.

Further, the inventors of the present invention also tested the combination of elemental sulphur, iron salts with fertilizer or micronutrients on certain crops like sugarcane, tomato crops. It was observed that addition of other micronutrients such as boron or zinc salts, fertilizers to the combination of the present invention may further enhance crop characteristics like straw weight, plant height and add to nutritional value of the crop. Further such combinations may additionally help in improving the crop yield, improved photosynthesis, increase chlorophyll content and uptake of nutrients by the crop.

Thus, it has been observed that the compositions of the present invention, demonstrate enhanced, efficacious and superior behaviour in the fields. In fact, various advantageous properties associated with the compositions according to the invention, include but are not limited to improved

TABLE 7

To assess the impact of particle size distribution in the composition comprising Sulphur + Ferric oxide on rice yield

| Treatment details | Range of particle size of compositon | Formulation dose (kg/acre) | Dose of nutrient salt in g/acre | | Average no. of tillers/ hills* | Seed Index (g) | Grain yield (q/acre) | % Yield increase over untreated |
|---|---|---|---|---|---|---|---|---|
| | | | S | Fe | | | | |
| T1-Untreated | — | — | — | — | 7.9 | 25.3 | 17.5 | — |
| T2-Sulphur (S-55%) + Ferric oxide 23% (Fe-16%) WDG according to an embodiment of the present invention | 0.1 to 20 micron | 5.0 | 2750 | 800 | 9.3 | 26.9 | 21.2 | 21.1 |
| T3-Sulphur (S-55%) + Ferric oxide 23% (Fe-16%) WDG | 0.1 to 50 micron | 5.0 | 2750 | 800 | 8.8 | 26.5 | 20.1 | 13.1 |
| T4-Sulphur (S-55%) + Ferric oxide 23% (Fe-16%) WDG | 20 to 50 micron | 5.0 | 2750 | 800 | 8.7 | 25.9 | 19.8 | 16.6 |
| T5-Sulphur (S-55%) + Ferric oxide 23% (Fe-16%) WDG | 50 to 100 micron | 5.0 | 2750 | 800 | 8.5 | 25.8 | 19.1 | 9.1 |
| CD (P > 0.05) | — | — | — | — | 0.39 | 0.44 | 1.03 | — |

*Mean of 20 hills

From the data represented in Table 7, it can be observed that treatment T2 (water dispersible granular composition of S-55%+Ferric oxide-23% having particle size distribution in the range of 0.1 to 20 microns) prepared according to an embodiment of the present invention demonstrates significant increase in yield than that of treatments T3 (S-55%+Ferric oxide-23% WDG having particle size distribution in the range of 0.1 to 50 microns), T4 (S-55%+Ferric oxide-23% WDG having particle size distribution in the range of 20 to 50 microns) and T5 (S-55%+Ferric oxide-23% WDG having particle size distribution in the range of 50 to 100 stability, improved toxicological and/or ecotoxicological behaviour, improved crop characteristics including crop yields, crop qualities such as improved nutrient content, more developed root system, increase in crop height, bigger leaf blade, less dead basal leaves, stronger tillers, greener leaf color, less fertilizers needed, tillering increase, increased shoot growth, improved plant or crop vigor, earlier flowering, more productive tillers, less plant verse (lodging), improved chlorophyll content of the leaves, photosynthetic activity, early seed germination, early grain maturity, improved quality of the produce, improved fortification of the crop, conditioning the soil, disease resistance and other advantages familiar to a person skilled in the art. Also, the compositions of the present invention are also suitable for drip irrigation or sprinkler irrigation in addition to other methods of applications of the agricultural compositions, in which most of the commercial products and prior art products fail.

Through the composition of the present invention, the number of applications or the amount of nutrients, fertilizers or pesticides are minimized. The composition is highly safe to the user and to the environment.

From the foregoing, it will be observed that numerous modifications and variations can be effectuated without departing from the true spirit and scope of the novel concepts of the present invention. It is to be understood that no limitation with respect to the specific embodiments illustrated is intended or should be inferred.

We claim:

1. A water dispersible granular crop nutrition and fortification composition comprising:
    elemental sulphur in the range of 1-90% w/w of the total composition;
    at least one iron salt, complexes, derivatives or mixtures thereof in the range of 1-70% w/w of the total composition;
    at least one dispersing agent in the range of about 1-30% w/w of the total composition; and
    wherein the granules of the composition are in the size range of 0.1-2.5 mm and comprised of particles in the size range of 0.1-20 microns.

2. The composition as claimed in claim 1, wherein the iron salts or complexes or derivatives thereof comprises a water soluble and/or water insoluble iron salts or complexes or derivatives thereof.

3. The composition as claimed in claim 2, wherein the water soluble iron salts or complexes or derivatives thereof comprises one or more of iron sulphate, iron succinate, iron fumarate, iron humate, iron fulvate, iron citrate, iron ascorbate or mixtures thereof.

4. The composition as claimed in claim 2, wherein the water insoluble iron salts or complexes or derivatives thereof comprises one or more of iron oxide, iron hydroxide, ferrous oxide, ferric oxide, ferroso ferric oxide, ferric hydroxide, iron oxalate, ferrous sucrate, ferric sucrate, ferrous hydroxide, iron phosphate, ferric phosphate, ferrous phosphate or mixtures thereof.

5. The composition as claimed in claim 2, wherein the water insoluble iron salt, complexes or derivatives is selected from iron oxide, ferric oxide, ferroso ferric oxide, ferrous oxide or mixtures thereof.

6. The composition as claimed in claim 1, further comprising at least one additional active ingredient selected from micronutrients, macronutrients, biostimulant, pesticidal actives and/or fertilizer selected from nitrogen fertilizer, phosphorous, potassium fertilizers, salts, complexes, derivatives or mixtures thereof.

7. The composition as claimed in claim 6, wherein at least one micronutrient or salts, complexes, derivative or mixtures thereof is present in the range of 0.1-70% by weight of the total composition.

8. The water dispersible granular composition as claimed in claim 1, wherein the composition is in the form of microgranules.

9. The water dispersible granular composition as claimed in claim 1, wherein the granules of the composition are in the size range of 0.1 to 1.5 mm.

10. The water dispersible granular composition as claimed in claim 1, wherein the granules of the composition comprise particles in the size range of 0.1 to 10 microns.

11. The water dispersible granular composition as claimed in claim 1, wherein the weight ratio of one or more of iron salts, complexes, derivatives or mixtures to elemental Sulphur is 1: 90 to 70:1.

12. The composition of claim 1, wherein the weight ratio of one or more of iron salts, complexes, derivatives or mixtures to elemental Sulphur is 1: 10 to 10:1.

13. The water dispersible granular composition as claimed in claim 1, wherein the composition further comprises one or more agrochemically acceptable excipients selected from the group consisting of one or more fillers or carriers or diluents, spreading agents, colorants, binders, buffers or pH adjusters or neutralizing agents, antifoaming agents or defoamers, anti-settling agents, penetrants, preservatives, ultraviolet absorbents, UV ray scattering agents, stabilizers and mixtures thereof.

14. The composition as claimed in claim 1, wherein suspensibility of the composition is at least 30%.

15. The water dispersible granular composition as claimed in claim 1, wherein the dispersibility of the composition is at least 50%.

16. The composition as claimed in claim 1, wherein the composition is a fertilizer composition, a nutrient composition, a crop strengthener composition, a soil conditioner composition, or a yield enhancer composition.

17. A process of preparation of the water dispersible granular crop nutrition and fortification composition as claimed in claim 1, wherein the process comprises:
    a. milling a blend of elemental sulphur in the range of 1-90% w/w of the total composition, at least one iron salts, complexes, derivatives or mixtures thereof in the range of 1-70% w/w of the total composition, and at least one dispersing agent in the range of about 1-30% w/w of the total composition to obtain a slurry or wet mix; and
    b. drying the slurry or wet mix to obtain the water dispersible granular composition as claimed in claim 1; wherein the granules of the composition are in the range of 0.1-2.5 mm and comprise of particles in the size range of 0.1 micron to 20 microns.

18. A method of improving plant health or yield, the method comprising treating at least one of a plant, a plant propagation material, locus or parts thereof, a seed, seedling or surrounding soil with the composition as claimed in claim 1.

19. A liquid suspension crop nutrition and fortification composition comprising:
    elemental sulphur in the range of 1-60% w/w of the total composition;
    at least one iron salt, complexes, derivatives or mixtures thereof in the range of 1-55% w/w of the total composition;
    at least one structuring agent in the range of about 0.01-5% w/w of the total composition;
    at least one agrochemically acceptable excipient; and
    wherein the composition is comprised of particles in the size range of 0.1-20 microns.

20. The liquid suspension composition as claimed in claim 19, wherein the weight ratio of one or more of iron salts, complexes, derivatives or mixtures to elemental Sulphur is 1: 60 to 55:1.

21. The liquid suspension composition as claimed in claim 19, wherein the structuring agent comprises one or more members selected from the group consisting of surfactants, thickeners, viscosity modifiers, tackifiers, suspension aid, rheology modifiers and anti-settling agents.

22. The liquid suspension composition as claimed in claim 19, wherein the agrochemically acceptable excipient is one or more members selected from the group consisting of colourants, water miscible solvents, pH adjusters, antifoaming agents, chelating or complexing or sesquitering agents, humectants, preservatives, UV ray scattering agents, antifreezing agent, stabilizers, sticking agents and spreading agents.

23. The liquid suspension composition as claimed in claim 19, wherein the viscosity of the composition is about 10 cps to about 1200 cps.

24. The liquid suspension composition as claimed in claim 19, wherein the viscosity of the composition is in the range of 10 cps to 500 cps.

25. A process of preparation of the liquid suspension crop nutrition and fortification composition as claimed in claim 19, wherein the process comprises:
   milling a blend of elemental sulphur in the range of 1-60% w/w of the total composition, at least one iron salts, complexes, derivatives or mixtures thereof in the range of 1-55% w/w of the total composition, at least one structuring agent in the range of about 0.01-5% w/w of the total composition and at least one agrochemically acceptable excipient to obtain a slurry or wet mix with a particle size range of 0.1 micron to 20 microns.

* * * * *